(12) United States Patent
Saneto et al.

(10) Patent No.: US 7,526,657 B2
(45) Date of Patent: Apr. 28, 2009

(54) INFORMATION PROCESSING APPARATUS, INFORMATION PROCESSING METHOD, AND PROGRAM STORAGE MEDIUM

(75) Inventors: Takanori Saneto, Tokyo (JP); Itaru Kawakami, Kanagawa (JP); Yoshimichi Kitaya, Kanagawa (JP)

(73) Assignee: Sony Corporation (JP)

( * ) Notice: Subject to any disclaimer, the term of this patent is extended or adjusted under 35 U.S.C. 154(b) by 499 days.

(21) Appl. No.: 09/999,225

(22) Filed: Nov. 30, 2001

(65) Prior Publication Data
US 2002/0085721 A1 Jul. 4, 2002

(30) Foreign Application Priority Data
Nov. 30, 2000 (JP) ............................ P2000-364896

(51) Int. Cl.
G06F 12/14 (2006.01)
G06F 7/04 (2006.01)
H04L 9/00 (2006.01)
H04N 7/167 (2006.01)
H04K 1/00 (2006.01)

(52) U.S. Cl. ...................... 713/193; 713/151; 713/161; 713/165; 713/171; 713/182; 726/6; 726/7; 726/27; 380/201; 380/255; 380/278; 380/44; 705/51; 705/52; 705/56

(58) Field of Classification Search ................. 713/193, 713/200; 380/201, 202
See application file for complete search history.

(56) References Cited

U.S. PATENT DOCUMENTS

| | | | | |
|---|---|---|---|---|
| 4,924,378 A | * | 5/1990 | Hershey et al. ............... | 726/29 |
| 5,309,516 A | * | 5/1994 | Takaragi et al. ............... | 380/45 |
| 5,351,294 A | * | 9/1994 | Matsumoto et al. ......... | 380/228 |
| 6,073,106 A | * | 6/2000 | Rozen et al. ................... | 705/3 |
| 6,144,743 A | * | 11/2000 | Yamada et al. ................ | 380/44 |
| 6,505,164 B1 | * | 1/2003 | Brunsting et al. .............. | 705/1 |
| 6,782,474 B1 | * | 8/2004 | Ylonen ....................... | 713/162 |
| 6,880,081 B1 | * | 4/2005 | Itkis ........................... | 713/163 |
| 6,904,522 B1 | * | 6/2005 | Benardeau et al. .......... | 713/156 |
| 6,915,434 B1 | * | 7/2005 | Kuroda et al. ............... | 713/193 |

(Continued)

FOREIGN PATENT DOCUMENTS

WO    WO 2004055737 A1 * 7/2004

(Continued)

OTHER PUBLICATIONS

Hulsebosch et al, Context Sensitive Access Control, 2005, ACM, pp. 111-119.*

(Continued)

Primary Examiner—Christopher A Revak
Assistant Examiner—Aravind K Moorthy
(74) Attorney, Agent, or Firm—Lerner, David, Littenberg, Krumholz & Mentlik, LLP

(57) ABSTRACT

An information processing apparatus and method prevent the use of content by any unauthorized third parties and enable content to be used on any desired information processing apparatuses. An approval server receives data for identifying a content management program from a personal computer, generates a group key which is shared in a group, stores the data and the group key as related with each other, and transmits the group key to the personal computer.

22 Claims, 32 Drawing Sheets

U.S. PATENT DOCUMENTS

| | | | | |
|---|---|---|---|---|
| 6,957,330 | B1* | 10/2005 | Hughes | 713/163 |
| 6,986,044 | B1* | 1/2006 | Inada | 713/170 |
| 7,024,395 | B1* | 4/2006 | McCown et al. | 705/65 |
| 2006/0064586 | A1* | 3/2006 | Stigliani et al. | 713/168 |
| 2006/0122931 | A1* | 6/2006 | Walker et al. | 705/39 |
| 2006/0278698 | A1* | 12/2006 | Lovett | 235/380 |
| 2007/0220594 | A1* | 9/2007 | Tulsyan | 726/5 |
| 2007/0226793 | A1* | 9/2007 | Tanabiki et al. | 726/21 |
| 2008/0170693 | A1* | 7/2008 | Spies et al. | 380/277 |

FOREIGN PATENT DOCUMENTS

WO     WO 2004099953 A1 * 11/2004

OTHER PUBLICATIONS

Baligand et al, A Concrete Solution for Web Services Adaptability Using Policies and Aspects, 2004, ACM, pp. 134-142.*

Gangwar et al, Secure and Efficient Dynamic Group Key Agreement Protocol for an Ad Hoc Network, 2006, IEEE, pp. 56-61.*

Adusumilli et al, DGKD: distributed group key distribution with authentication capability, 2005, IEEE, pp. 286-293.*

* cited by examiner

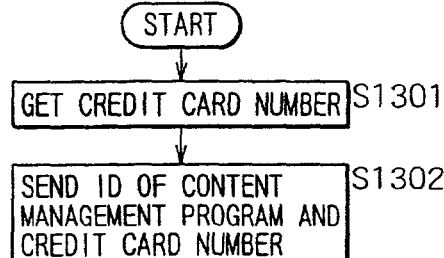
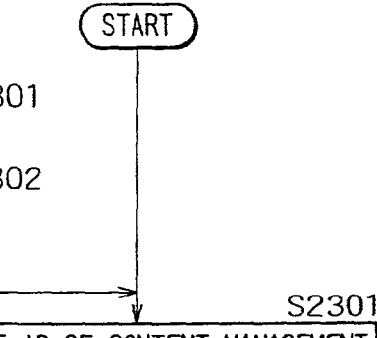
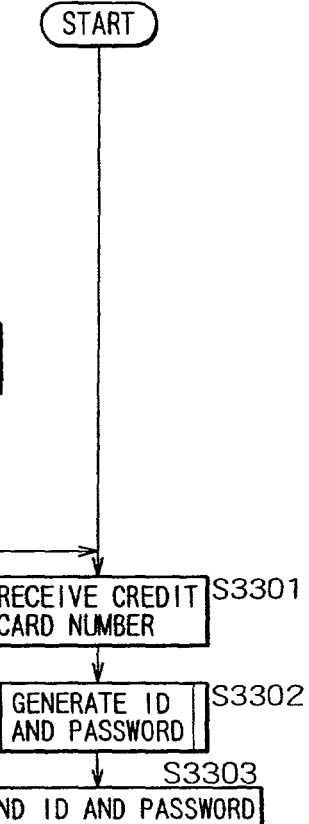
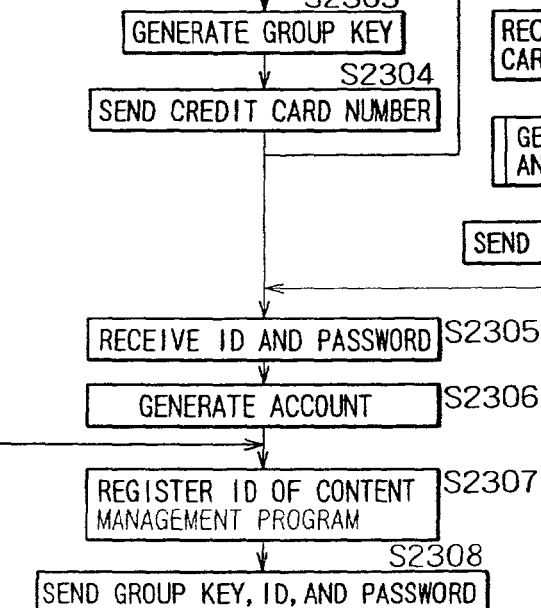
FIG. 17

| USER ID | CONTENT |
|---------|---------|
| aaaaa | AAAAA |
| bbbbb | BBBBB |
| ccccc | CCCCC |
| ⋮ | ⋮ |

INFORMATION PROCESSING APPARATUS, INFORMATION PROCESSING METHOD, AND PROGRAM STORAGE MEDIUM

CROSS-REFERENCE TO RELATED APPLICATIONS

The present application claims priority from Japanese Application No. 2000-364896 filed Nov. 30, 2000, the disclosure of which is hereby incorporated by reference herein.

BACKGROUND OF THE INVENTION

The present invention relates generally to an information processing apparatus, an information processing method and a program storage medium and, more particularly, to an information processing apparatus, an information processing method and a program storage medium for preventing unauthorized usage of content.

Various technologies are in use for preventing, on the basis of encryption, unauthorized usage of digital content of music and images, for example, from being practiced.

Referring to FIG. 1, there is shown a schematic diagram illustrating a related-art process of encrypting content for recording and decrypting the encrypted content for reproduction. An encryption program used in this example generates an encryption key on the basis of an input user ID and password and encrypts content by use of the generated encryption key.

To reproduce the encrypted content, a decryption program asks the user for his ID and password and, when the received ID and password are determined to be valid, generates a decryption key based thereon, and decrypts the encrypted content by use of the generated decryption key.

Thus, unless the correct ID and password are obtained, no user can access any content. Consequently, unauthorized usage of content can be prevented.

A technology is also used in which a decryption key is encrypted by a storage key and the storage key is securely stored in a device which uses content.

However, the related-art technologies have a drawback in that, when a decryption key is encrypted by a storage key and content is used on a device in which the storage key is securely stored, a user having a plurality of devices can use predetermined content on only a predetermined device and therefore cannot use any desired content on any desired devices.

SUMMARY OF THE INVENTION

It is an object of the present invention to provide an information processing apparatus and an information processing method and a program storage medium which allow the use of any desired content on any desired devices while preventing the use of the content by any unauthorized third parties.

In carrying out the invention and according to one aspect thereof, there is provided an information processing apparatus, including a first receiver operable to receive identification data from another information processing apparatus; a key generator operable to generate a group key upon receipt of the identification data, the group key being shared in a group including the another information processing apparatus; a recorder operable to record the group key in correspondence with the identification data; and a first transmitter operable to transmit the group key to the another information processing apparatus.

Preferably, the identification data includes data for identifying a content management program of the another information processing apparatus.

Preferably, the key generator is further operable to generate an identifier for identifying the group if the first receiver has received the identification data for the first time from the another information processing apparatus.

In carrying out the invention and according to another aspect thereof, there is provided a method for processing information in an information processing apparatus, including receiving identification data from another information processing apparatus; generating a group key upon receipt of the identification data, the group key being shared in a group including the another information processing apparatus; recording the group key in correspondence with the identification data; and transmitting the group key to another information processing apparatus.

In carrying out the invention and according to still another aspect thereof, there is provided a program storage medium storing a computer-readable program for processing information in an information processing apparatus, the computer-readable program including receiving identification data from another information processing apparatus; generating a group key upon receipt of the identification data, the group key being shared in a group including the another information processing apparatus; recording the group key in correspondence with the identification data; and transmitting the group key to the another information processing apparatus.

In the information processing apparatus, the information processing method, and the program storage medium, identification data transmitted from another information processing apparatus is received, a group key to be shared in a group to which the above-mentioned another information processing apparatus belongs is generated upon receipt of the identification data, the generated group key is recorded in association with the identification data, and the group key is transmitted to the above-mentioned another information processing apparatus. Consequently, the novel constitution allows the use of any desired content on any desired devices while preventing the use of the content by any unauthorized third parties.

In carrying out the invention and according to yet another aspect thereof, there is provided an information processing apparatus for managing a copy operation for copying information by a plurality of other information processing apparatuses on the basis of a group key shared in a group, the group key being owned by the plurality of other information processing apparatuses, including a storage unit operable to store a first identifier for identifying the group; a receiver operable to receive a second identifier for identifying the group from the plurality of other information processing apparatuses; a comparing unit operable to compare the first identifier with the second identifier to produce a comparison result; and an output unit operable to output data for approving the copy operation to the plurality of other information processing apparatuses based on the comparison result.

Preferably, the storage unit is further operable to store a password; the receiver is operable to receive the password; and the comparing unit is operable to compare the first identifier with the password.

In carrying out the invention and according to a different aspect thereof, there is provided a method for processing information in an information processing apparatus for managing a copy operation for copying information by a plurality of other information processing apparatuses on the basis of a group key shared in a group, the group key being owned by the plurality of other information processing apparatuses, the method including storing a first identifier for identifying the group; receiving a second identifier for identifying the group from the plurality of other information processing apparatuses; comparing the first identifier with the second identifier to produce a comparison result; and outputting data for approving the copy operation to the plurality of other information processing apparatuses based on the comparison result.

In carrying out the invention and according to a still different aspect thereof, there is provided a program storage medium storing a computer-readable program for processing information in an information processing apparatus for managing a copy operation for copying information by a plurality of other information processing apparatuses on the basis of a group key shared in a group, the group key being owned by the plurality of other information processing apparatuses, the computer-readable program including storing a first identifier for identifying the group; receiving a second identifier for identifying the group from the plurality of other information processing apparatuses; comparing the first identifier with the second identifier to produce a comparison result; and outputting data for approving the copy operation to the plurality of other information processing apparatuses based on the comparison result.

In the information processing apparatus, the information processing method, and the program storage medium, an ID for identifying a group is stored, an ID for identifying the group is received from another information processing apparatus, the stored ID is compared with the received ID, and, on the basis of a comparison result, data for approving the copying of information is output to the above-mentioned another information processing apparatus. Consequently, the novel constitution allows the use of any desired content on any desired devices while preventing the use of the content by any unauthorized third parties.

In carrying out the invention and according to a yet different aspect thereof, there is provided an information processing apparatus, including a first transmitter operable to transmit identification data to a first information processing apparatus; a first receiver operable to receive a group key from the first information processing apparatus, the group key being shared in a group; a storage unit operable to store the group key received by the first receiver; and an encryption unit operable to encrypt the group key by a content key which encrypts content if the content is to be output.

Preferably, the information processing apparatus further includes a decryption unit operable to decrypt the content key, wherein the encryption unit is operable to encrypt the content key decrypted by the decryption unit.

Preferably, the information processing apparatus further includes an acquisition unit operable to acquire an identifier for identifying the group and a password; a second transmitter operable to transmit the identifier and the password acquired by the acquisition unit to a second information processing apparatus; a second receiver operable to receive data for approving a copy operation of the content from the second information processing apparatus; and a copy controller operable to control the copy operation of the content based on the data for approving the copy operation received by the second receiver.

Preferably, the identification data includes data for identifying a content management program of the information processing apparatus.

In carrying out the invention and according to a separate aspect thereof, there is provided a method for processing information in an information processing apparatus, including transmitting identification data to an information processing apparatus; receiving a group key from the information processing apparatus, the group key being shared in a group; storing the group key received in the receiving step; and encrypting the group key by a content key which encrypts content if the content is to be output.

In carrying out the invention and according to a still separate aspect thereof, there is provided a program storage medium storing a computer-readable program for processing information in an information processing apparatus, the computer-readable program including transmitting identification data to an information processing apparatus; receiving a group key from the information processing apparatus, the group key being shared in a group; storing the group key received in the receiving step; and encrypting the group key by a content key which encrypts content if the content is to be output.

In the information processing apparatus, the information processing method, and the program storage medium, identification data is transmitted to a first information processing apparatus, a group key to be shared in a group is received from the above-mentioned first information processing apparatus, the received group key is stored, and, if content is to be output, a content key by which the content is encrypted by the group key. Consequently, the novel constitution allows the use of any desired content on any desired devices while preventing the use of the content by any unauthorized third parties.

BRIEF DESCRIPTION OF THE DRAWINGS

These and other objects of the invention will be seen by reference to the following description, taken in connection with the accompanying drawings, in which:

FIG. 17 is a flowchart describing a registration process;

DETAILED DESCRIPTION

Figure 1:
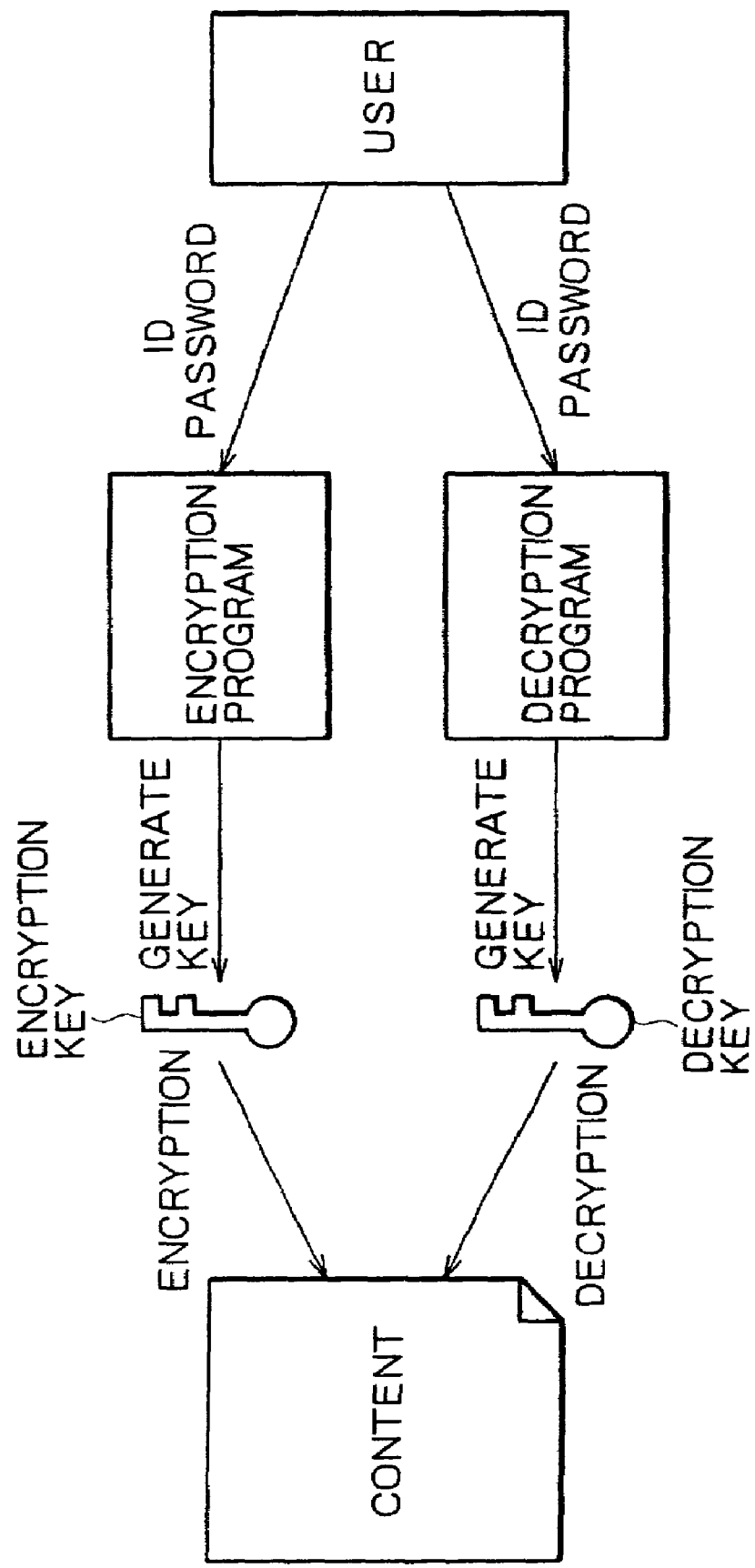
FIG. 1 is a schematic diagram illustrating a related-art software program for encrypting content for recording and decrypting the encrypted content for reproduction.
Figure 2:
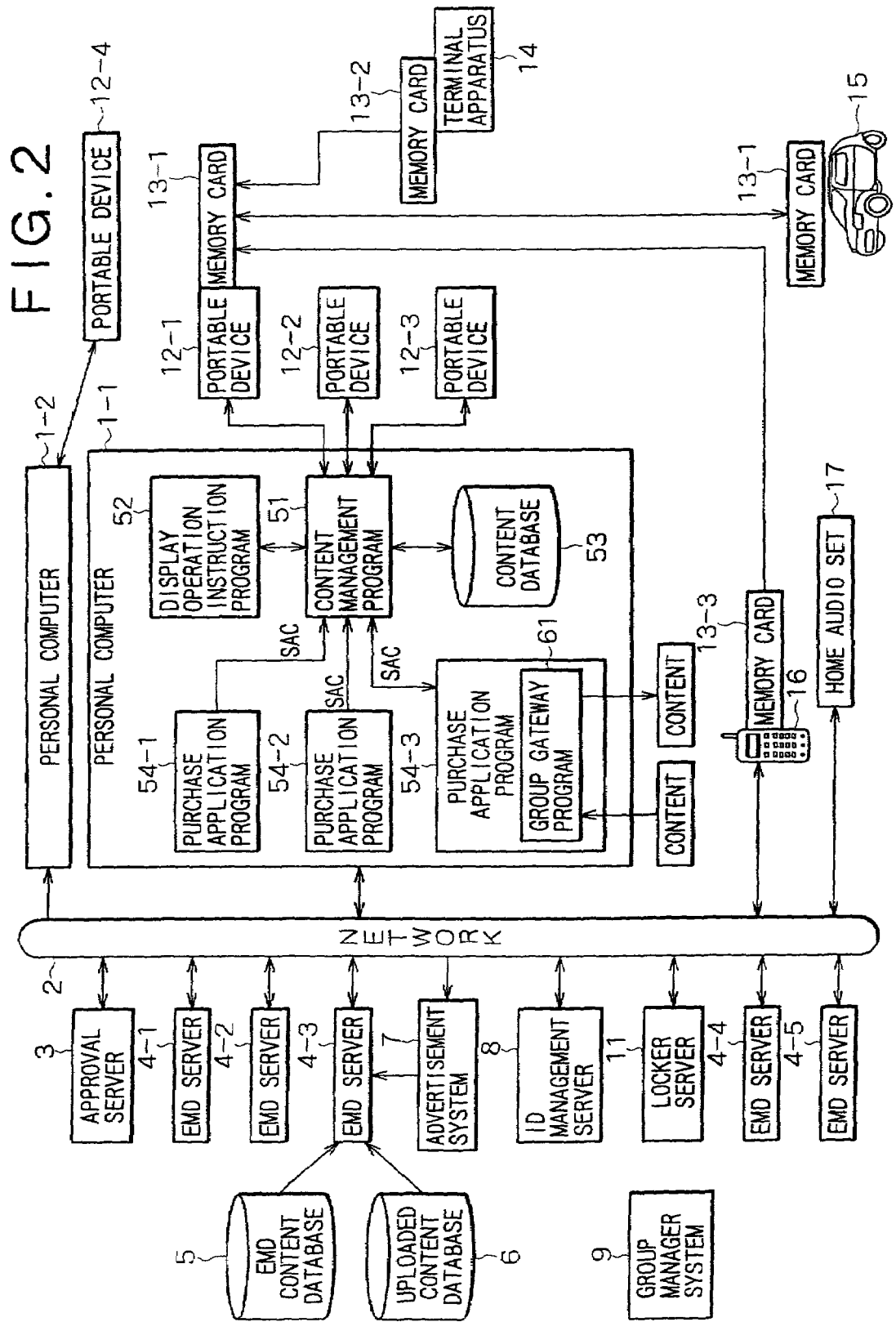
FIG. 2 is a block diagram illustrating a music data management system practiced as one embodiment of the invention.

This invention will be described in further detail by way of example with reference to the accompanying drawings. Now, referring to FIG. 2, there is shown one preferred embodiment of a music data management system associated with the present invention. As shown, a personal computer 1-1 is connected to a network 2 which is a local area network or the Internet, for example.

The personal computer 1-1 executes a content management program 51, a display operation instruction program 52, and purchase application programs 54-1 through 54-3 and, at the same time, internally constitutes a content database 53.

The content management program 51 encrypts content and stores the encrypted content in the content database 53 and manages the use of the content stored in the content database 53, which will be detailed later.

The display operation instruction program 52 displays content-associated information and, at the same time, instructs the content management program 51 to reproduce or import content or execute other inputs made by the user.

The content database 53 stores the content encrypted and supplied from the content management program 51 and, upon request from the content management program 51, supplies the encrypted content thereto.

The purchase application programs 54-1 through 54-3 execute the process of purchasing content from EMD servers 4-1 through 4-3. The purchase application programs 54-1 through 54-3 are connected to the content management program 51 via SAC (Secure Authentication Channel).

The purchase application program 54-3 executes a group gateway program 61. The group gateway program 61, when outputting encrypted content, encrypts a content key for decrypting the encrypted content by a group key, to be described later, to allow the use of the content only on authorized equipment. The group gateway program 61, when importing encrypted content, decrypts the content key for decrypting the encrypted content by a group key to be described later. "Import" herein denotes the recording of content in a usable state.

The personal computer 1-1 and the personal computer 1-2 send the number of the credit card of the user to an approval server 3 via the network 2 for registration with the approval server 3, thereby acquiring a group key, and ID, and a password from the approval server 3, which will be described later.

The approval server 3, when the personal computer 1-1 has been registered, records the credit card number, ID, and password of the user of the personal computer 1-1 to an ID management server 8. The approval server 3 approves the personal computer 1-2 when the personal computer 1-2 imports content output from the personal computer 1-1, for example.

The personal computer 1-2, when not approved by the approval server 3, cannot import content output from the personal computer 1-1.

The personal computer 1-1 compresses music data (hereafter referred to as content) received from EMD (Electrical Music Distribution) servers 4-1 through 4-3 or read from a CD (Compact Disc) to be described later in a predetermined compression algorithm, ATRAC3 (trademark) for example, and encrypts the compressed content in a predetermined encryption algorithm such as DES (Data Encryption Standard), storing the resultant content.

The personal computer 1-1 records usage rule data for the encrypted and recorded content. The usage rule data includes conditions that the content matching the usage rule data can be used or copied on three portable devices (also referred to as PDs) 12-1 through 12-3 at a time, moved to other personal computers, and so on, for example.

The personal computer 1-1 stores the encrypted and recorded content in the connected portable device 12-1 along with content-associated data (for example, music title, the number of reproduction times, expiration of reproduction, equalizer information, and so on) and updates the usage rule data corresponding to this stored content (this updating is hereafter referred to also as checkout). The personal computer 1-1 stores the encrypted and recorded content in the connected portable device 12-2 along with content-associated data and accordingly updates the usage rule data corresponding to this stored content. The personal computer 1-1 stores the encrypted and recorded content in the connected portable device 12-3 along with content-associated data and accordingly updates the usage rule data corresponding to this stored content.

Also, the personal computer 1-1 causes the connected portable device 12-1 to delete the content checked out by the personal computer 1-1 and accordingly updates the usage rule data corresponding to the deleted content (this updating is hereafter referred to also as check-in). The personal computer 1-1 causes the connected portable device 12-2 to delete the content checked out by the personal computer 1-1 and accordingly updates the usage rule data corresponding to the deleted content. The personal computer 1-1 causes the connected portable device 12-3 to delete the content checked out by the personal computer 1-1 and accordingly updates the usage rule data corresponding to the deleted content.

The personal computer 1-1 cannot check in the content checked out by the personal computer 1-2 to the portable device 12-1. The personal computer 1-1 cannot check in the content checked out by the personal computer 1-2 to the portable device 12-2. The personal computer 1-1 cannot check in the content checked out by the personal computer 1-2 to the portable device 12-3.

The personal computer 1-2 is connected to the network 2, which is a local area network or the Internet. The personal computer 1-2 compresses the content received from the EMD servers 4-1 through 4-3 or read from a CD to be described later in a predetermined algorithm and encrypts the compressed content in a predetermined algorithm such as DES, storing the resultant content in personal computer 1-2.

The personal computer 1-2 records usage rule data for the encrypted and recorded content. The usage rule data includes rules that the content matching the usage rule data can be used or copied on three portable devices at a time, moved to other personal computers, and so on, for example.

The personal computer 1-2 stores the encrypted and recorded content in the connected portable device 12-4 along with content-associated data and updates the usage rule data corresponding to this stored content (namely, checkout). When content checkout is instructed, the personal computer 1-2 will not check the content to the portable device 12-4 if a usage time limit or a permitted reproduction count to be described later is set to that content.

Also, the personal computer 1-2 causes the connected portable device 12-4 to delete the content checked out by the personal computer 1-2 and accordingly updates the usage rule data corresponding to the deleted content.

The personal computer 1-2 cannot check in the content checked out by the personal computer 1-1 to the portable device 12-4.

In what follows, the personal computers 1-1 and 1-2 are generically referred to as a personal computer 1 unless otherwise noted.

The EMD server 4-1, in response to a request from the personal computer 1, supplies content thereto along with content-associated data via the network 2. The EMD server 4-2, in response to a request from the personal computer 1, also supplies content thereto along with content-associated data via the network 2.

The EMD server 4-3, in response to a request from the personal computer 1, supplies the content supplied from the EMD content database 5 or an uploaded content database 6 to the personal computer 1 along with content-associated data (for example, music title, the number of reproduction times, expiration of reproduction, equalizer information, and so on), via the network 2. The EMD server 4-3 supplies the advertisement data supplied from an advertisement system 7 to the personal computer 1-1 or 1-2 via the network 2.

The content to be supplied by the EMD servers 4-1 through 4-3 is compressed by the same or different compression algorithms. The content to be supplied by the EMD servers 4-1 through 4-3 is encrypted by the same or different encryption algorithms.

When the user purchases content from any of the EMD servers 4-1 through 4-5, the ID management server 8 sends the credit card number, ID, and password of the user of the personal computer 1-1 recorded upon registration thereof to any of the EMD servers 4-1 through 4-5 from which the content is to be purchased. When the content is purchased, the EMD servers 4-1 through 4-5 execute a fee-charging process on the basis of the credit card number, ID, and password supplied from the ID management server 8.

The group manager system 9 manages content, ID, and password usage rules such as the registration of the approval server 3, the approval of content usage, and recording and transmission of credit card numbers, IDs, and passwords by the ID management server 8.

A locker server 11 records the content supplied from the personal computer 1-1 or 1-2 via the network 2 and, in response to a request to send content, transmits the recorded content to the personal computer 1-1 or 1-2.

The portable device 12-1 stores the content supplied from the personal computer 1 (namely, the checked out content) in a loaded memory card 13-1 along with the content-associated data (for example, music title, the number of reproduction times, expiration of reproduction, equalizer information, and so on). The portable device 12-1 reproduces the content from the memory card 13-1 on the basis of the content-associated data and outputs the reproduced content to a headphone, not shown, for example.

For example, if the user attempts to reproduce the content in excess of the number of times the content is allowed to be reproduced, which is recorded as content associated data, the portable device 12-1 disables the reproduction of this content. If the user attempts to reproduce the content after the expiration of reproduction, which is recorded as content-associated data, the portable device 12-1 disables the reproduction of this content. The portable device 12-1 equalizes an audio signal on the basis of the equalizer information recorded as content-associated data and outputs the equalized audio signal.

The user can unload the portable device 12-1 from the personal computer 1, carry about the portable device 12-1, reproduce the content stored in the memory card 13-1, and, for example, listen to the music corresponding to the content through a headphone.

The portable device 12-1 can reproduce the content stored in the memory card 13-2 by loading the same into the portable device 12-1, the content being supplied from a terminal device 14 installed in a store, for example.

The memory card 13-1 in which content is stored via the portable device 12-1 is unloaded therefrom and loaded in an audio set of an automobile 15. The audio set of the automobile 15 with the memory card 13-1 loaded therein retrieves the content from the memory card 13-1 and reproduces the retrieved content.

A camera-mounted digital mobile telephone 16 with the memory card 13-3 loaded therein asks the EMD server 4-4 for the supply of content via the network 2 and stores the supplied content into the memory card 13-3. The camera-mounted digital mobile telephone 16 reproduces the content stored in the loaded memory card 13-3. The portable device 12-1 can reproduce the content stored in the memory card 13-3 by loading the same into the portable device 12-1.

The portable device 12-2 stores the content supplied from the personal computer 1 along with the content-associated data. On the basis of the content-associated data, the portable device 12-2 reproduces the stored content and outputs the reproduced content to a headphone, not shown, for example. The user can unload the portable device 12-2 storing the content from the personal computer 1, carry about the portable device 12-2, reproduce the stored content, and listen to the music corresponding to the content through the headphone, for example.

The portable device 12-3 stores the content supplied from the personal computer 1 along with the content-associated data. On the basis of the content-associated data, the portable device 12-3 reproduces the stored content and outputs the reproduced content to a headphone, not shown, for example. The user can unload the portable device 12-3 storing the content from the personal computer 1, carry about the portable device 12-3, reproduce the stored content, and listen to the music corresponding to the content through the headphone, for example.

The portable device 12-4 stores the content (only the content to which usage expiration or the number of reproduction times to be described later are not set) supplied from the personal computer 1 along with the content-associated data. On the basis of the content-associated data, the portable device 12-4 reproduces the stored content and outputs the reproduced content to a headphone, not shown, for example. The user can unload the portable device 12-4 storing the content from the personal computer 1, carry about the portable device 12-4, reproduce the stored content, and listen to the music corresponding to the content through the headphone, for example.

A home audio set 17 asks the EMD server 4-5 for content via the network 2, stores the requested content supplied from the EMD server 4-5, and reproduces the stored content.

Figure 3:
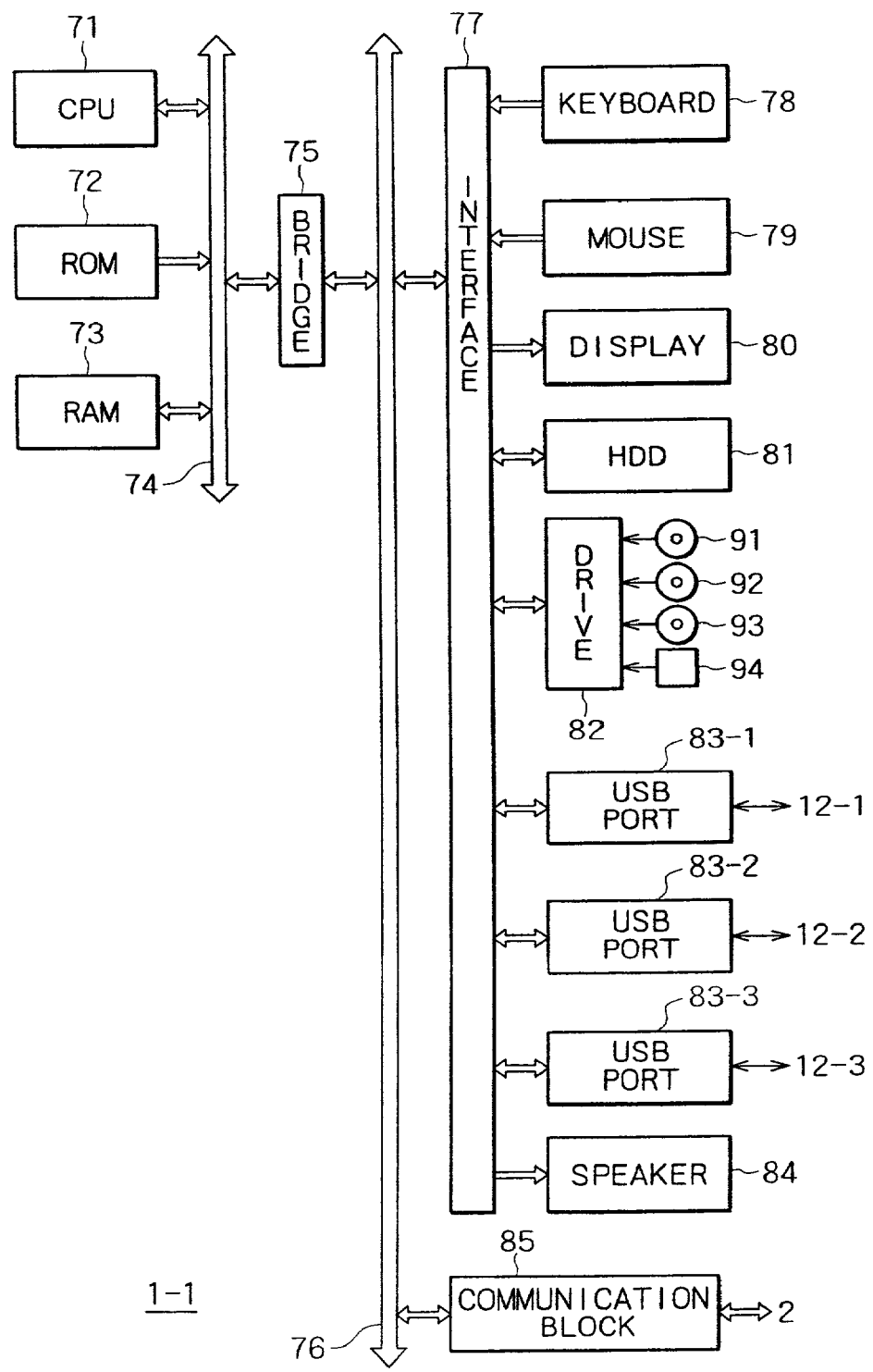
FIG. 3 is a block diagram illustrating an exemplary configuration of a personal computer.

Referring to FIG. 3, there is shown an exemplary configuration of the personal computer 1-1. A CPU (Central Processing Unit) 71 actually executes various application programs such as the content management program 51 and a group gateway program 61, and an OS (Operating System). A ROM (Read Only Memory) 72 generally stores computer programs and basically fixed data of computational parameters to be used by the CPU 71. A RAM 73 stores computer programs to be used by the CPU 71 in its execution and parameters which change from time to time in the execution. The CPU 71, ROM 72, and RAM 73 are connected each other by host bus 74 constituted by a CPU bus, etc.

The host bus 74 is connected to an external bus 76 such as a PCI (Peripheral Component Interconnect/Interface) via a bridge 75.

A keyboard 78 is operated by the user to enter various commands into the CPU 71. A mouse 79 is operated by the user to specify or select points on the screen of a display 80 which is constituted by a liquid crystal display, a CRT (Cathode Ray Tube), and the like. The CRT display 80 displays various kinds of information in text and images. An HDD (Hard Disk Drive) 81 drives a hard disk to record or reproduce programs to be executed by the CPU 71 or information.

A drive 82 reads data or computer programs from a magnetic disc 91, an optical disc 92 (including a CD), a magneto-optical disc 93, or a semiconductor memory 94 as required to supply the data or computer programs to the RAM 73 via the interface 77, the external bus 76, the bridge 75, and the host bus 74.

USB (Universal Serial Bus) port 83-1 is connected to the portable device 12-1 through a predetermined cable. The USB port 83-1 outputs the data (including content or a command of the portable device 12-1, for example) supplied from the HDD 81, the CPU 71, or the RAM 73 to the portable device 12-1 via the interface 77, the external bus 76, the bridge 75, and the host bus 74.

The USB 83-2 is connected to the portable device 12-2 through a predetermined cable. The USB port 83-2 outputs the data (including content or a command of the portable device 12-2, for example) supplied from the HDD 81, the CPU 71, or the RAM 73 to the portable device 12-2 via the interface 77, the external bus 76, the bridge 75, and the host bus 74.

The USB 83-3 is connected to the portable device 12-3 through a predetermined cable. The USB port 83-3 outputs the data (including content or a command of the portable device 12-3, for example) supplied from the HDD 81, the CPU 71, or the RAM 73 to the portable device 12-3 via the interface 77, the external bus 76, the bridge 75, and the host bus 74.

A speaker 84 outputs a predetermined audio signal corresponding to the content on the basis of the data or audio signal supplied from the interface 77.

These components, the keyboard 78 through the speaker 84, are connected to the interface 77 which is connected to the CPU 71 via the external bus 76, the bridge 75, and the host bus 74.

A communication block 85 connected to the network 2 transmits, in predetermined packets, the data (for example, a registration request or a content send request) supplied from the CPU 71 or the HDD 81, and outputs the data (for example, authentication key and content) contained in received packets to the CPU 71, the RAM 73, or the HDD 81, via the network 2.

The communication block 85 is also connected to the CPU 71 via the external bus 76, the bridge 75, and the host bus 74.

The configuration of the personal computer 1-2 is the same as that of the personal computer 1-1, so that its description will be skipped.

Figure 4:
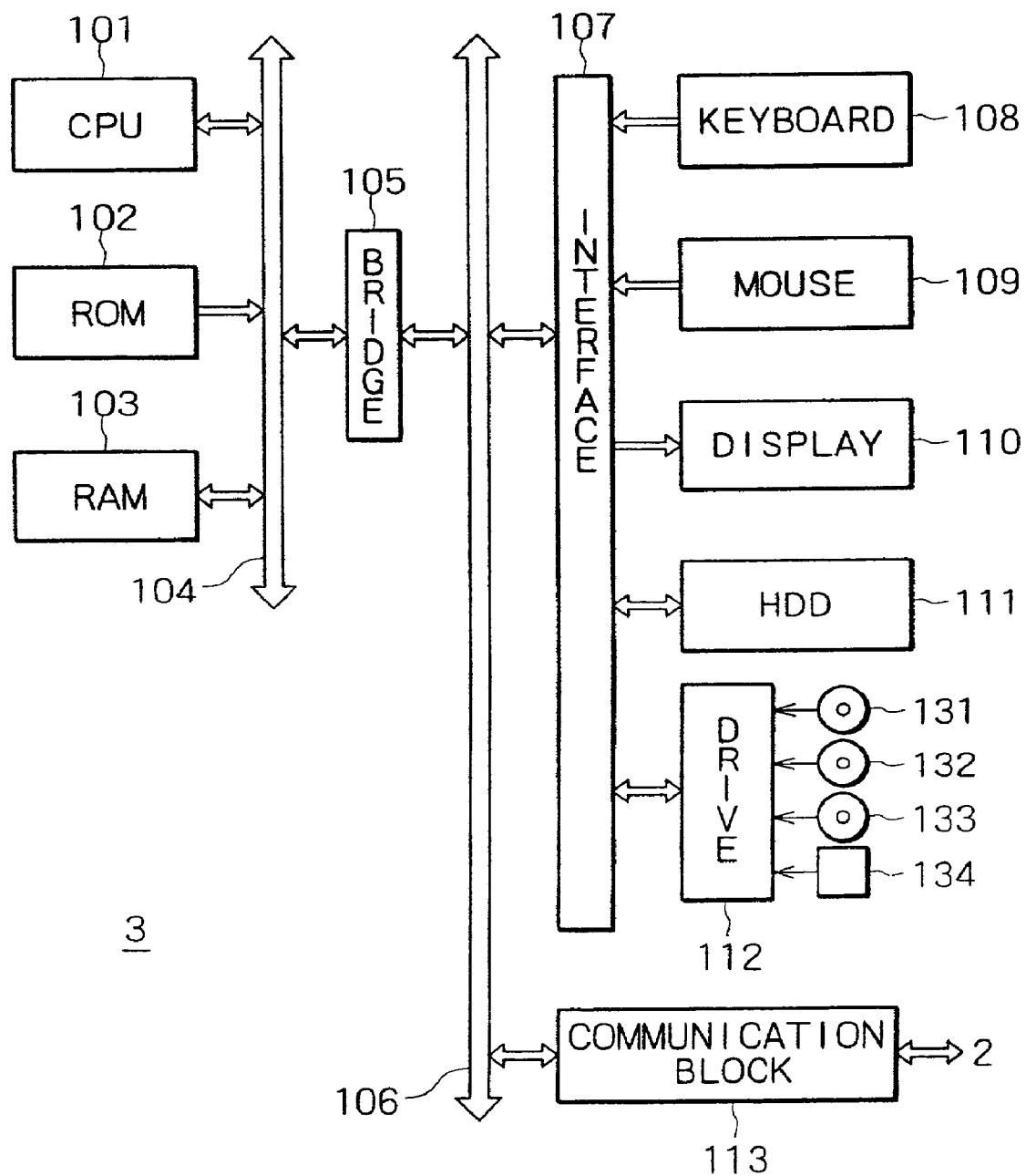
FIG. 4 is a block diagram illustrating an exemplary configuration of an approval server.

Referring to FIG. 4, there is shown an exemplary configuration of the approval server 3. A CPU 101 actually executes various application programs such as a Web server program and an OS. A ROM 102 generally stores computer programs and basically fixed data of computational parameters to be used by the CPU 101. A RAM 103 stores computer programs to be used by the CPU 101 in its execution and parameters which change from time to time in the execution. The CPU 101, ROM 102, and RAM 103 are connected each other by a host bus 104 constituted by a CPU bus, for example.

The host bus 104 is connected to an external bus 106 such as a PCI via a bridge 105.

A keyboard 108 is operated by the user to enter various commands into the CPU 101. A mouse 109 is operated by the user to specify or select points on the screen of a display 110 which is constituted by a liquid crystal apparatus, a CRT, and the like. The display 110 displays various kinds of information in text and images. An HDD 111 drives a hard disk to record or reproduce programs to be executed by the CPU 101 or information.

A drive 112 reads data or computer programs from a magnetic disc 131, an optical disc 132, a magneto-optical disc 133, or a semiconductor memory 134 as required to supply the data or computer programs to the RAM 103 via the interface 107, the external bus 106, the bridge 105, and the host bus 104.

These components, the keyboard 108 through the drive 112, are connected to the interface 107 which is connected to the CPU 101 via the external bus 106, the bridge 105, and the host bus 104.

A communication block 113, connected to the network 2, outputs the data (for example, the data necessary for registration to be described later, or the ID (Identifier) of a predetermined program) stored in the received packets to the CPU 101, the RAM 103, or the HDD 111 and stores the data (for example, ID and password) supplied from the CPU 101 or the HDD 111 into predetermined packets to send them through the network 2.

The communication block 113 is connected to the CPU 101 via the external bus 106, the bridge 105, and the host bus 104.

The configuration of each of the EMD servers 4-1 through 4-5, the ID management server 8, and the locker server 11 is the same as that of the approval server 3, so that their description will be skipped.

The following describes the features which will be realized by the personal computer 1-1 by executing predetermined programs.

Figure 5:
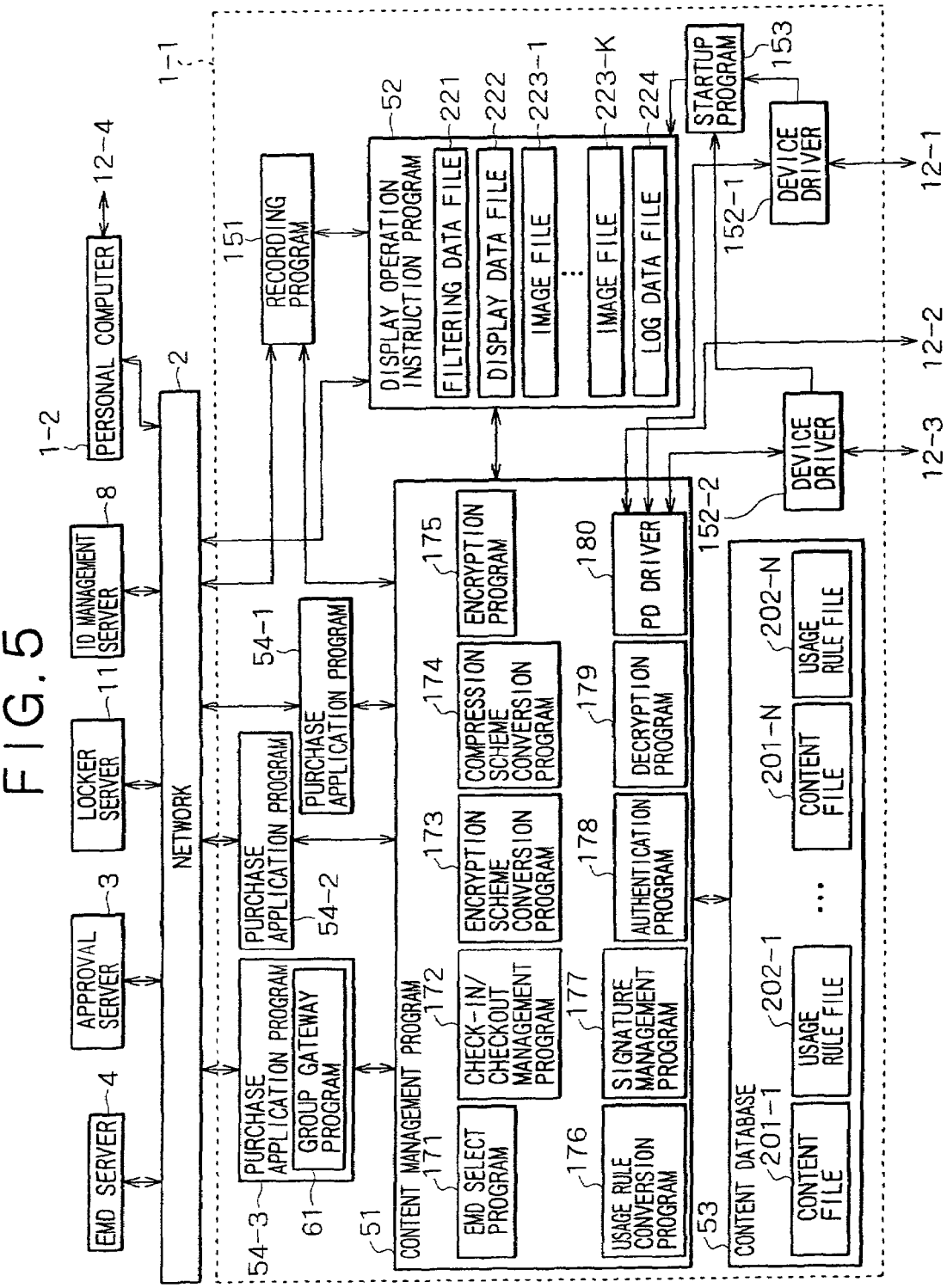
FIG. 5 is a block diagram illustrating an exemplary functional configuration of the personal computer.

Referring to FIG. 5, there is shown a block diagram illustrating the features of the personal computer 1-1 which are realized by the execution of predetermined programs by the CPU 71.

The content management program 51 is made up of a plurality of programs including an EMD select program 171, a check-in/checkout management program 172, an encryption scheme conversion program 173, a compression scheme conversion program 174, an encryption program 175, a usage rule conversion program 176, a signature management program 177, an authentication program 178, a decryption program 179, and a PD driver 180.

The content management program 51, written by shuffled instructions or encrypted instructions, is constituted to hide the content of its processing from the outside, making it difficult to interpret the processing content (for example, if the user directly reads the content management program 51, no instruction can be identified).

The EMD select program 171, when the content management program 51 is installed on the personal computer 1, is not included therein, but is supplied from a registration server, not shown, via the network 2 when EMD registration is performed. The EMD select program 171 selects the connection with any one of the EMD servers 4-1 through 4-3 and causes the purchase application programs 54-1 through 54-3 to execute the communication (for example, downloading of content at the time of content purchase) with any one of the EMD servers 4-1 through 4-3.

The check-in/checkout management program 172 sets check-in or checkout, checks out the content stored in content files 201-1 through 201-N to any one of the portable devices 12-1 through 12-3 on the basis of usage rule files 202-1 through 202-N recorded in the content database 53, or checks in the content stored in the portable devices 12-1 through 12-3.

The check-in/checkout management program 172 updates the usage rule data stored in the usage rule files 202-1 through 202-N recorded in the content database 53 in accordance with the process of check-in or checkout.

The encryption scheme conversion program 173 converts the encryption scheme of the content received by the purchase application program 54-1 from the EMD server 4-1 via the network, the encryption scheme of the content received by the purchase application program 54-2 from the EMD server 4-2 via the network, or the encryption scheme of the content received by the purchase application program 54-3 from the EMD server 4-3 via the network into the encryption scheme of the content stored in the content files 201-1 through 201-N recorded in the content database 53.

Also, when checking out content to the portable device 12-1 or 12-3, the encryption scheme conversion program 173 converts the encryption scheme of the content to be checked out into that usable by the portable device 12-1 or the 12-3.

The compression scheme conversion program 174 converts the compression scheme of the content received by the purchase application program 54-1 from the EMD server 4-1 via the network 2, the compression scheme of the content received by the purchase application program 54-2 from the EMD server 4-2 via the network 2, or the compression scheme of the content received by the purchase application program 54-3 from the EMD server 4-3 via the network 2 into the compression scheme of the content stored in the content files 201-1 through 201-N recorded in the content database 53.

The compression scheme conversion program 174 encodes the content (not compressed) read from a CD for example and supplied from a recording program 151 in the same encoding algorithm as that used on the content stored in the content files 201-1 through 201-N recorded in the content database 53.

Also, when checking out content to the portable device 12-1 or 12-3, the compression scheme conversion program 174 converts the compression scheme of the content to be checked out into the compression scheme usable on the portable device 12-1 or 12-3.

The encryption program 175 encrypts the content (not encrypted) read from a CD for example and supplied from the recording program 151 in the same encryption scheme as that used on the content stored in the content files 201-1 through 201-N recorded in the content database 53.

The usage rule conversion program 176 converts the format of the data indicative of the usage rules of the content received by the purchase application program 54-1 from the EMD server 4-1 via the network 2, the data indicative of the usage rules of the content received by the purchase application program 54-2 from the EMD server 4-2 via the network 2, or the data indicative of the usage rules of the content received by the purchase application program 54-3 from the EMD server 4-3 via the network 2 into the same format as that of the usage rule data stored in the usage rule files 202-1 through 202-N recorded in the content database 53.

Also, when checking out content to the portable device 12-1 or 12-3, the usage rule conversion program 176 converts the usage rule data corresponding to the content to be checked out into the usage rule data usable on the portable device 12-1 or 12-3.

The signature management program 177 checks, before performing check-in or checkout processing, the usage rule data for any alteration on the basis of the signature included in the usage rule data stored in the usage rule files 202-1 through 202-N recorded in the content database 53. The signature management program 177 updates the signature included in the usage rule data in response to the updating of the usage rule data stored in the usage rule files 202-1 through 202-N recorded in the content database 53 which is executed at the time of check-in or checkout processing.

The authentication program 178 executes cross authentication between the content management program 51 and the purchase application program 54-1, the content management program 51 and the purchase application program 54-2, and the content management program 51 and the purchase application program 54-3. Also, the authentication program 178 stores authentication keys for use in executing cross-authentication between the EMD server 4-1 and the purchase application program 54-1, the EMD server 4-2 and the purchase application program 54-2, and the EMD server 4-3 and the purchase application program 54-3.

The authentication key for use in the cross-authentication by the authentication program 178 is not stored in the authentication program 178 when the content management program 51 is installed in the personal computer 1. When the registration process has been normally performed by the display operation instruction program 52, the authentication key is supplied from a registration server, not shown, to be stored in the authentication program 178.

The decryption program 179 decrypts content when the personal computer 1-1 reproduces the content stored in the content files 201-1 through 201-N recorded in the content database 53.

When checking out predetermined content to the portable device 12-2 or checking in predetermined content therefrom, the PD driver 180 supplies commands for causing the portable device 12-2 to execute the content or predetermined processing.

When checking out predetermined content to the portable device 12-1 or checking in predetermined content therefrom, the PD driver 180 supplies commands for causing the device driver 152-1 to execute the content or predetermined processing.

When checking out predetermined content to the portable device 12-3 or checking in predetermined content therefrom, the PD driver 180 supplies commands for causing the device driver 152-2 to execute the content or predetermined processing.

The display operation instruction program 52 displays a predetermined window image on the display 80 on the basis of a filtering data file 221, a display data file 222, image files 223-1 through 223-K, or a log data file 224 and instructs the content management program 51 to execute check-in or checkout processing in response to an operation made by the user on the keyboard 78 or the mouse 79.

The filtering data file 221 stores the data for weighting each content stored in the content files 201-1 through 201-N recorded in the content database 53 and is stored in the HDD 81.

The display data file 222 stores the data about the content stored in the content files 201-1 through 201-N recorded in the content database 53 and is stored in the HDD 81.

The image files 223-1 through 223-K store the images for the content files 201-1 through 201-N stored in the content database 53 or the images for a package and are stored in the HDD 81.

The log data file 224 stores the log data such as the number of times the content stored in the content files 201-1 through 201-N recorded in the content database 53 has been checked out and checked in and the dates of checkout and check-in, and the log data file 224 is stored in the HDD 81.

At the time of registration processing, the display operation instruction program 52 transmits, via the network 2, the ID of the content management program 51 which is stored beforehand to a registration server, not shown, and, at the same time, receives an authentication key and the EMD select program 171 from the registration server to supply them to the content management program 51.

When recording is instructed, the recording program 151 reads content from the CD, which is the optical disk 92 loaded in the drive 82, and outputs the content to the content management program 51 along with the content-associated usage rule data such as the maximum number of permitted checkouts.

The content database 53 stores the content compressed in a predetermined compression scheme and encrypted in a predetermined encryption scheme supplied from the content management program 51 into one of the content files 201-1 through 201-N (recorded in the HDD 81). The content database 53 stores the usage rule data for the content stored in the content files 201-1 through 201-N in one of the usage rule files 202-1 through 202-N (recorded in the HDD 81) corresponding to the content files 201-1 through 201-N in which the content is stored.

The content database 53 may record the content files 201-1 through 201-N or the usage rule files 202-1 through 202-N as records.

For example, the usage rule data for the content stored in the content file 201-1 are stored in the usage rule file 202-1. The usage rule data for the content stored in the content file 201-N are stored in the usage rule file 202-N.

A startup program 153 is a so-called resident program which is always operating when the operating system of the personal computer 1-1 is active. When a signal comes from the device driver 152-1 telling that the portable device 12-1 has been connected to the USB port 83-1, the startup program 153 starts the display operation instruction program 52 if the program 52 is not activated.

When a signal comes from the device driver 152-2 telling that the portable device 12-3 has been connected to the USB port 83-3, the startup program 153 starts the display operation instruction program 52 if the program 52 is not activated.

In what follows, the content files 201-1 through 201-N will be generically referred to simply as a content file 201 unless otherwise noted. Likewise, the usage rule files 202-1 through 202-N will be generically referred to simply as a usage rule file 202 unless otherwise noted.

The functional configuration of the personal computer 1-2 is the same as that of the personal computer 1-1, so that its description will be skipped.

In what follows, the personal computer 1-1 and the personal computer 1-2 will be generically referred to simply as a personal computer 1 unless otherwise noted.

Figure 6:
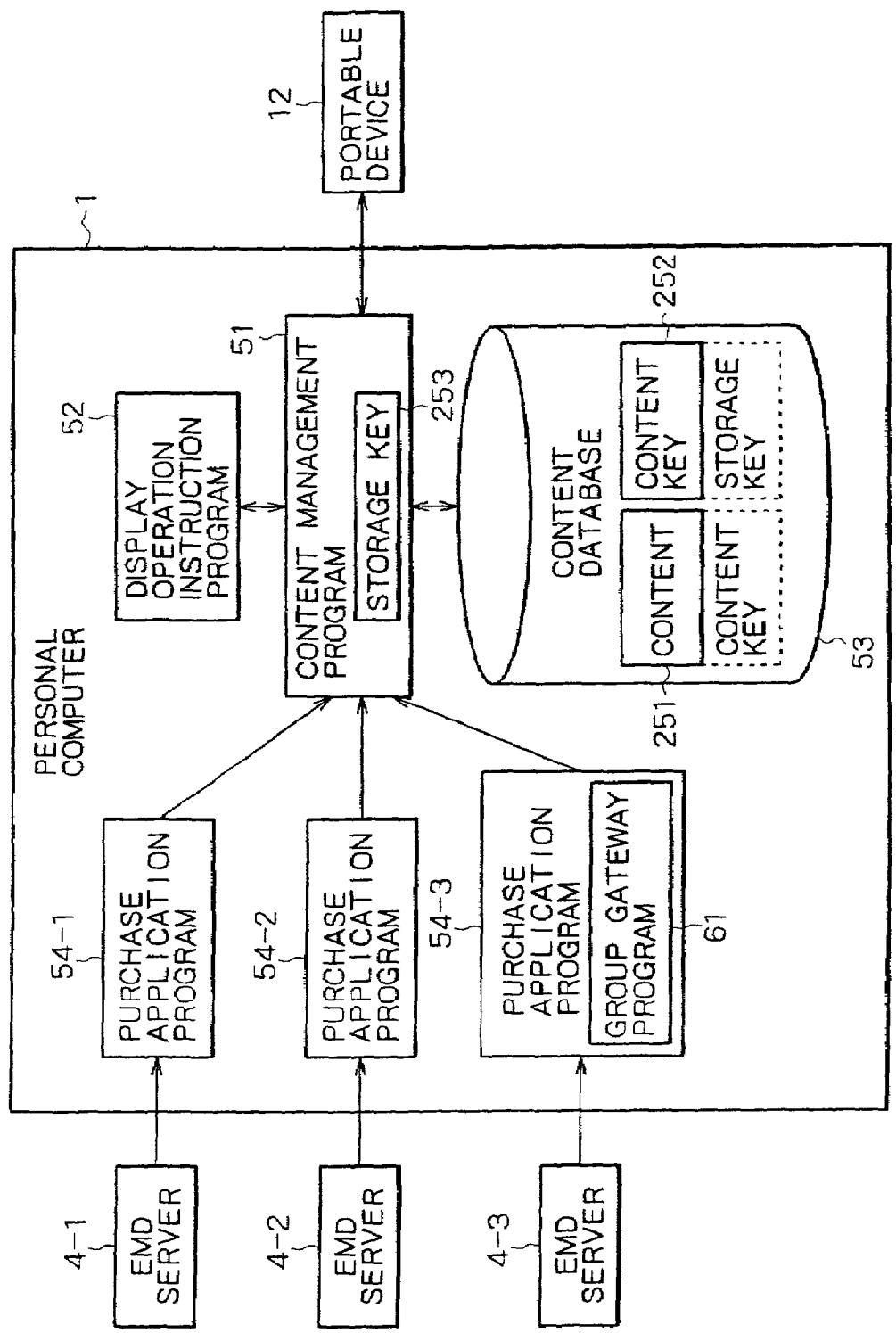
FIG. 6 is a schematic diagram illustrating content stored in a personal computer.

Referring to FIG. 6, there is shown a schematic diagram illustrating content stored in the personal computer 1. The purchase application program 54-1 receives content encrypted by a content key from the EMD server 4-1 along with this content key and supplies the received content to the content management program 51 via the SAC. The purchase application program 54-1 decrypts the content key encrypted by a session key, for example, and supplies the decrypted content key to the content management program 51.

The purchase application program 54-2 receives content encrypted by a content key from the EMD server 4-2 along with this content key and supplies the received content to the content management program 51 via the SAC. The purchase application program 54-2 decrypts the content key encrypted by a session key, for example, and supplies the decrypted content key to the content management program 51.

The purchase application program 54-3 receives content encrypted by a content key from the EMD server 4-3 along with this content key and supplies the received content to the content management program 51 via the SAC. The purchase application program 54-3 decrypts the content key encrypted by a session key, for example, and supplies the decrypted content key to the content management program 51.

At the time of registration with the approval server 3, the group gateway program 61 transmits the credit card number and ID of the content management program 51 which are stored beforehand to the approval server 3 and receives the group key, ID, and password from the approval server 3.

The content management program 51 stores a storage key 253 beforehand and, upon request from the display operation instruction program 52, encrypts, by this storage key 253, the content key supplied from the purchase application program 54-1, the content key supplied from the purchase application program 54-2, or the content key supplied from the purchase application program 54-3.

The content management program 51 records content 251 encrypted by the content key and a content key 252 encrypted by the storage key 253 in the content database 53 as the content file 201.

Figure 7:
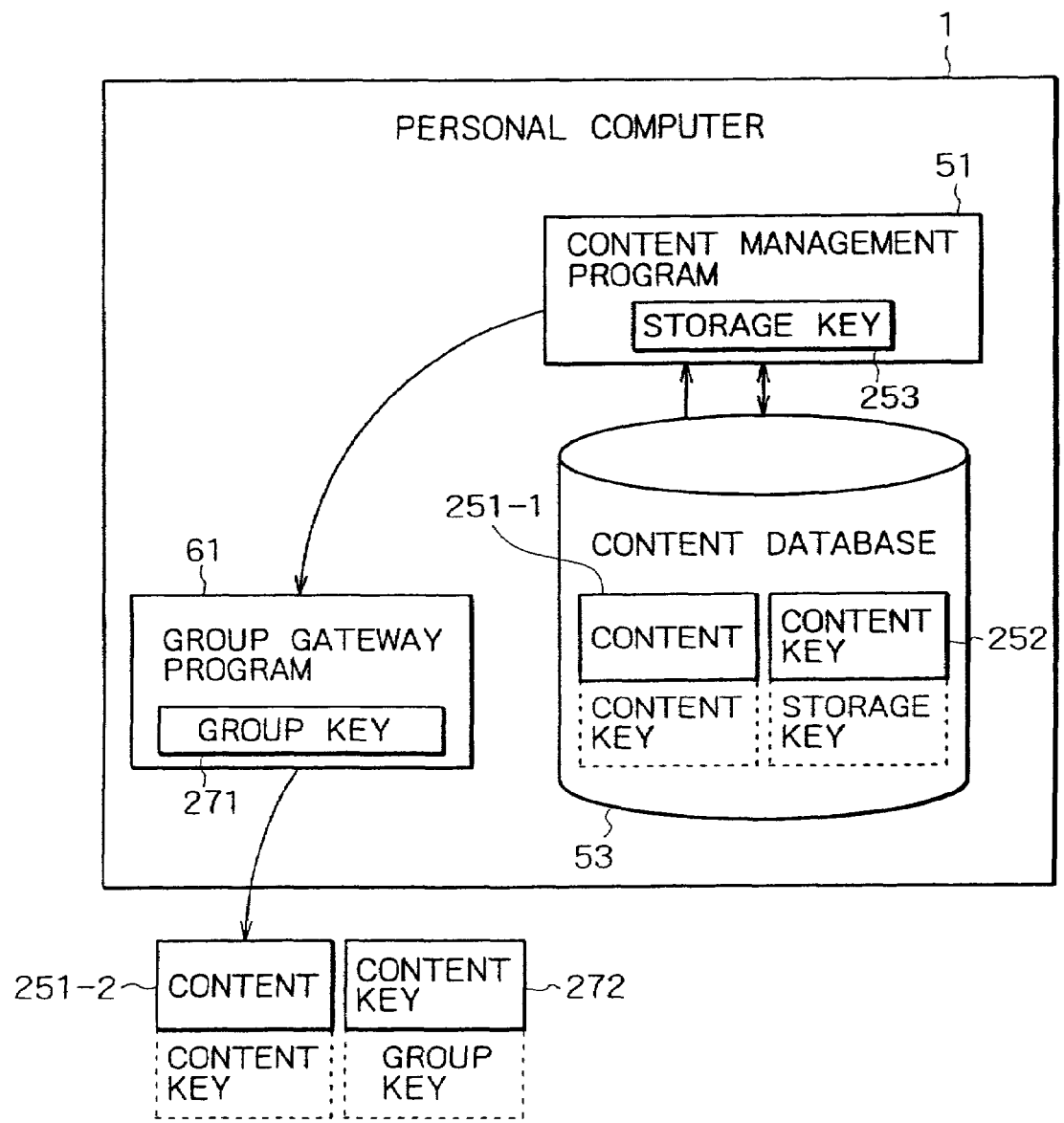
FIG. 7 is a schematic diagram illustrating content to be output from the personal computer.

Referring to FIG. 7, there is shown a schematic diagram illustrating content to be output by the personal computer 1. The group gateway program 61 of the purchase application program 54-3 asks the content management program 51 for content 251-1.

The content management program 51 reads the content 251-1 and the content key 252 from the content database 53. The content management program 51 decrypts the content key 252 by the storage key 253 and supplies the decrypted content key to the group gateway program 61 along with the content 251-1 encrypted by the content key.

The group gateway program 61 encrypts the decrypted content key by a group key 271 and outputs content 251-2 encrypted by the content key along with content key 272 encrypted by the group key 271.

The content 251-2 output from the personal computer 1 is encrypted by the content key 272 and the content key 272 is encrypted by the group key 271, so that the content 251-2 cannot be used as it is.

Figure 8:
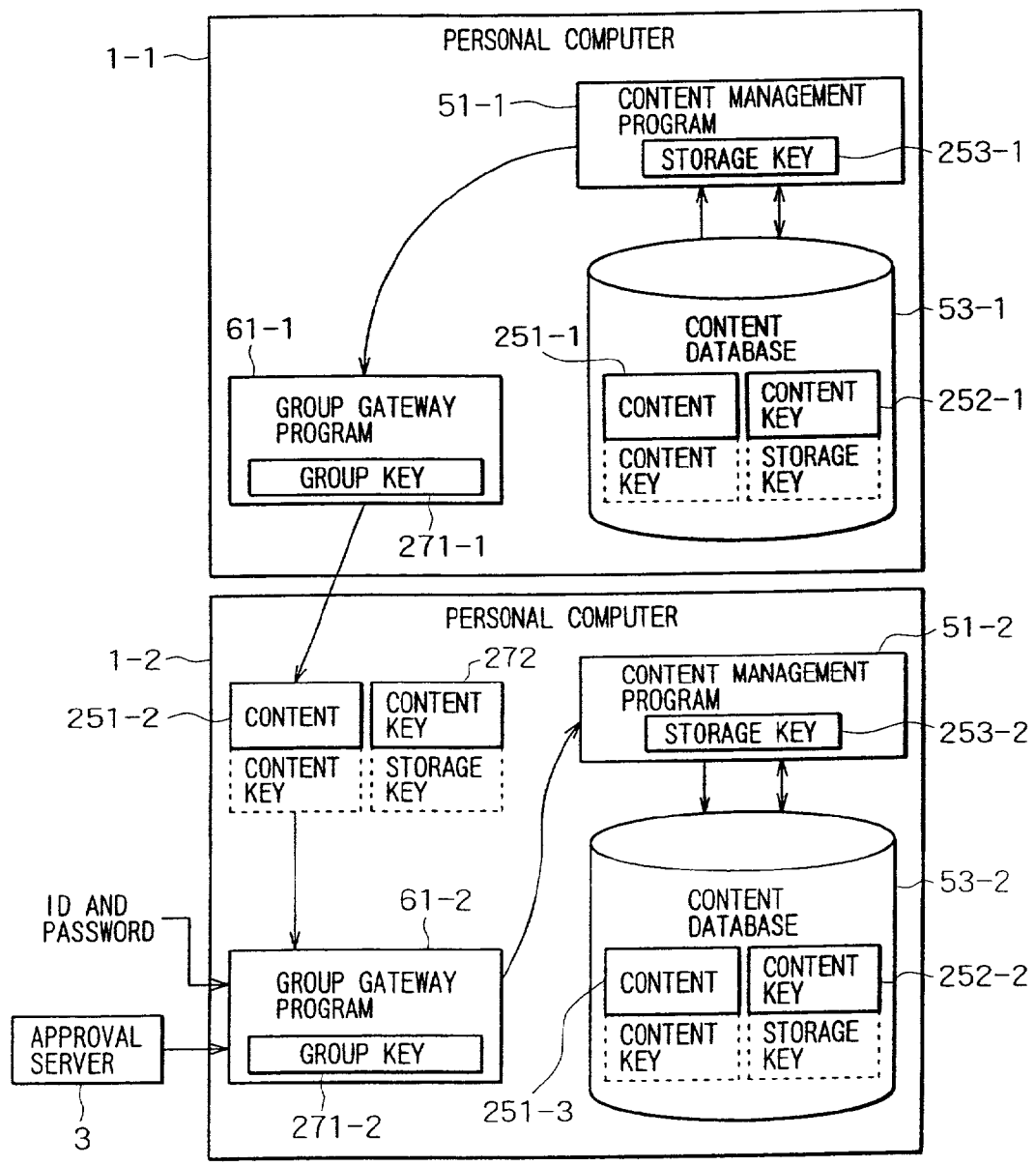
FIG. 8 is a schematic diagram illustrating an operation by a personal computer which imports content.

The following describes an operation of the personal computer 1-2 which imports the content 251-2 from the personal computer 1-1 with reference to FIG. 8.

When the correct ID and password have been input and an approval is obtained from the approval server 3, a group gateway program 61-2 of the personal computer 1-2 decrypts the content key 272 by a group key 271-2 stored beforehand.

The group key 271-2 stored in the group gateway program 61-2 is the same as the group key 271-1 stored in the group gateway program 61-1.

The group gateway program 61-2 supplies the decrypted content key and the content 251-2 encrypted by this content key to the content management program 51-2.

The content management program 51-2 encrypts the content key by a storage key 253-2 and records content 251-3 encrypted by the content key into a content database 53-2 along with the content key 252-2 encrypted by the storage key 253-2.

When using the content 251-3 imported from the personal computer 1-1, the personal computer 1-2 decrypts the content key 252-2 by the storage key 51-2 and decrypts the content 251-3 by the decrypted content key to provide plaintext content.

Thus, the personal computer 1-1 and the personal computer 1-2, respectively having the group key 271-1 and the group key 271-2 having a same value, are regarded as belonging to a same group.

The group key 271-1 and the group key 271-2 having a same value are supplied from the approval server 3 at the time of registration.

Figure 9:
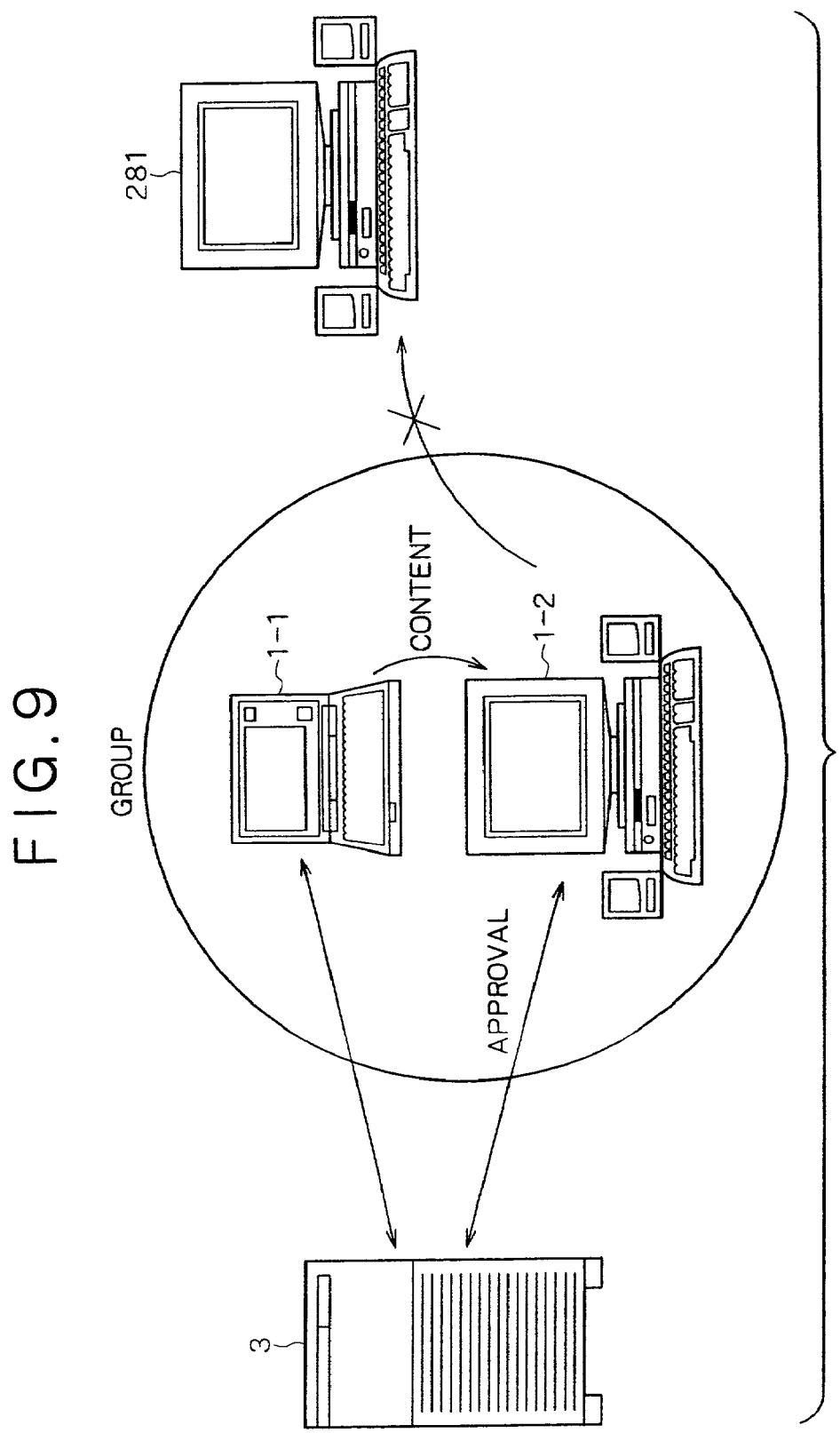
FIG. 9 is a schematic diagram illustrating an approval operation by the approval server when importing content.

As shown in FIG. 9, the personal computer 1-2 belonging to the same group to which the personal computer 1-1 belongs can import content output from the personal computer 1-1 when approved by the approval server 3.

However, a personal computer 281 which does not belong to the same group to which the personal computer 1-1 belongs cannot import and use content output from the personal computer 1-1.

Figure 10:
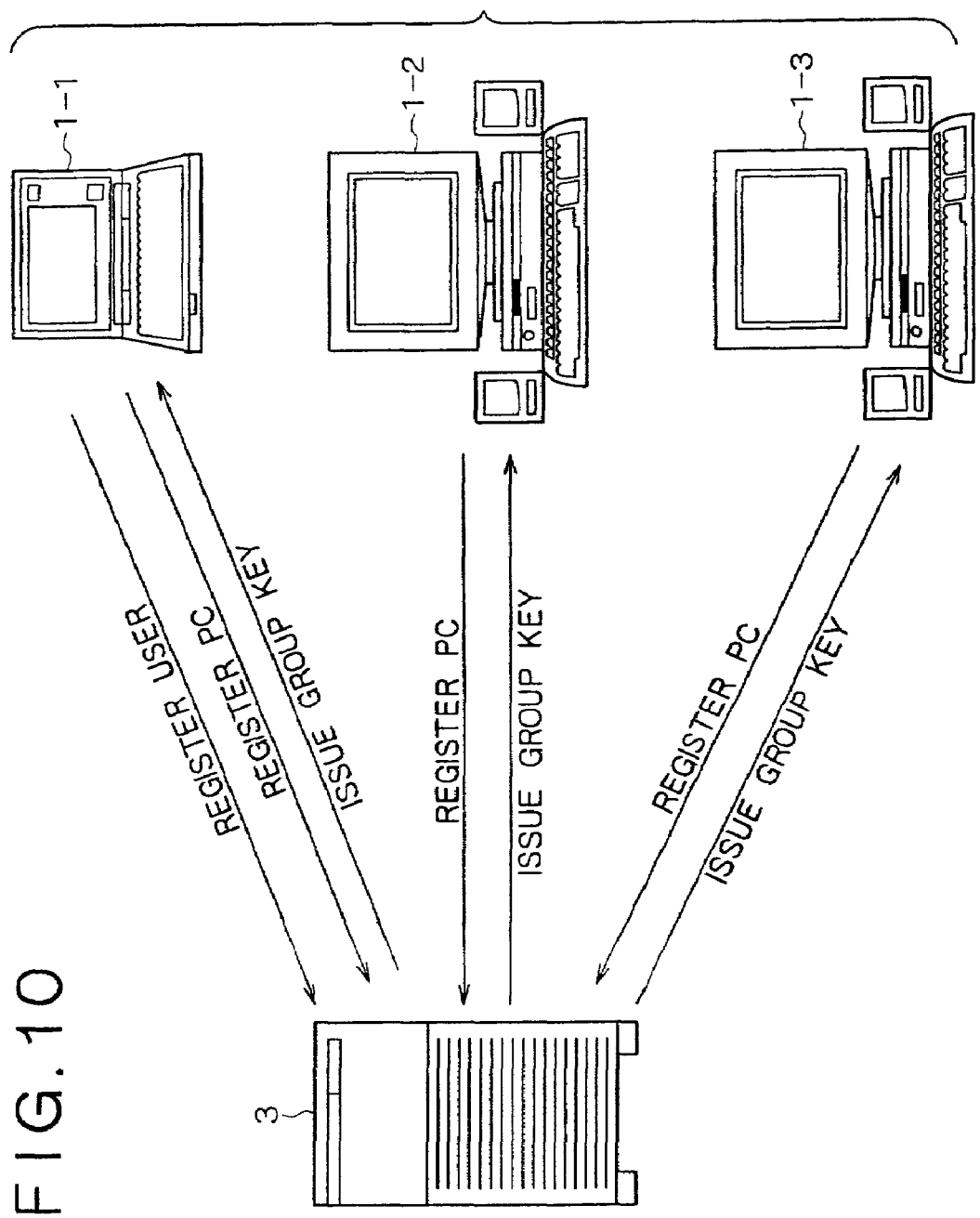
FIG. 10 is a schematic diagram illustrating a process for registering personal computers belonging to one group with the approval server.

Referring to FIG. 10, there is shown a process of registering the personal computers 1-1 through 1-3 which belong to the same group with the approval server 3.

When the first personal computer 1-1 belonging to the same group is registered with the approval server 3, the personal computer 1-1 transmits the user's credit card number, name, and mail address, for example, to the approval server 3, along with the ID of the content management program 51 of the personal computer 1-1. The approval server 3 records the received ID of the content management program 51, credit card number, name, and mail address to register the personal computer 1-1 and its user. When the registration has been completed, the approval server 3 transmits the group key 271 to the personal computer 1-1 along with the ID and password of the group. The personal computer 1-1 stores the group key 271 supplied from the approval server 3.

The ID of the group supplied by the approval server 3 is the user's credit card number. The password which is alternatively transmitted by the approval server 3 is the user's credit card number.

If the ID or password of a group is disclosed to a third party, the possibility that the users belonging to the group will suffer unexpected disadvantages increases. Therefore, the user of the personal computer 1-1 belonging to the group does not disclose the ID and password of the group to any third parties. This makes it practicable for the content output from the personal computer 1-1 to be used by a plurality of devices without being exposed to unauthorized usage.

When personal computer 1-2 belonging to the group to which the personal computer 1-1 belongs is registered with the approval server 3, the personal computer 1-2 transmits the ID and other information of the content management program 51 of the personal computer 1-2 to the approval server 3. The approval server 3 records the received ID and other information of the content management program 51 to register the personal computer 1-2. Then, the approval server 3 transmits the group key 271 to the personal computer 1-2. The personal computer 1-2 stores the received group key 271.

When the personal computer 1-3 belonging to the group to which the personal computer 1-1 belongs is registered with the approval server 3, the personal computer 1-3 transmits the ID and other information of the content management program 51 of the personal computer 1-3 to the approval server 3. The approval server 3 records the received ID and other information of the content management program 51 to register the personal computer 1-3. Then, the approval server 3 transmits the group key 271 to the personal computer 1-3. The personal computer 1-3 stores the received group key 271 from the approval server 3.

Thus, the personal computers 1-1 through 1-3 belonging to the same group store the same group key 271.

Figure 11:
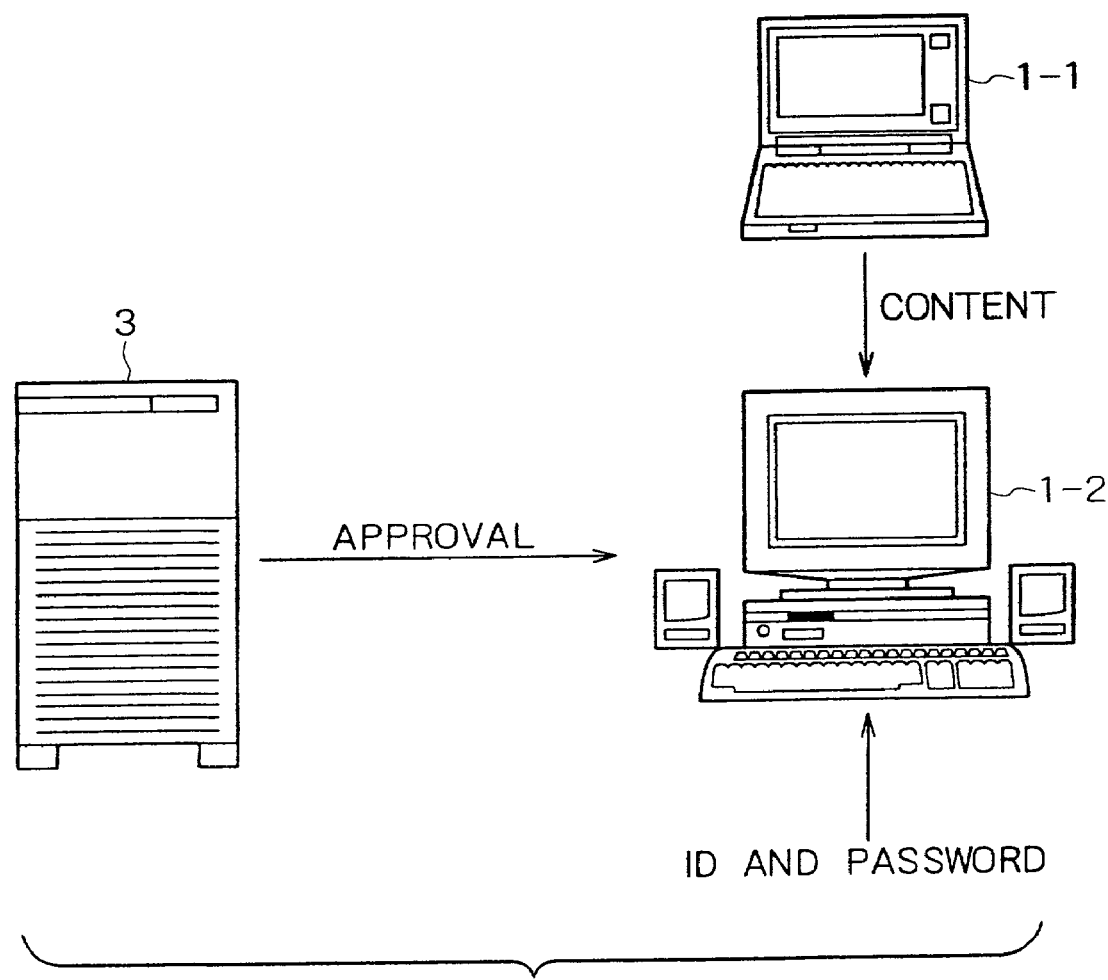
FIG. 11 is a schematic diagram illustrating a process for importing content.

Referring to FIG. 11, there is shown a schematic diagram illustrating the import processing of content. When importing content from the personal computer 1-1, the personal computer 1-2 asks the user to input the ID and password of the group and the approval server 3 for an approval.

When the correct ID and password of the group have been inputted and an approval has come from the approval server 3, the personal computer 1-2 executes the import of the content from the personal computer 1-1.

Figure 12:
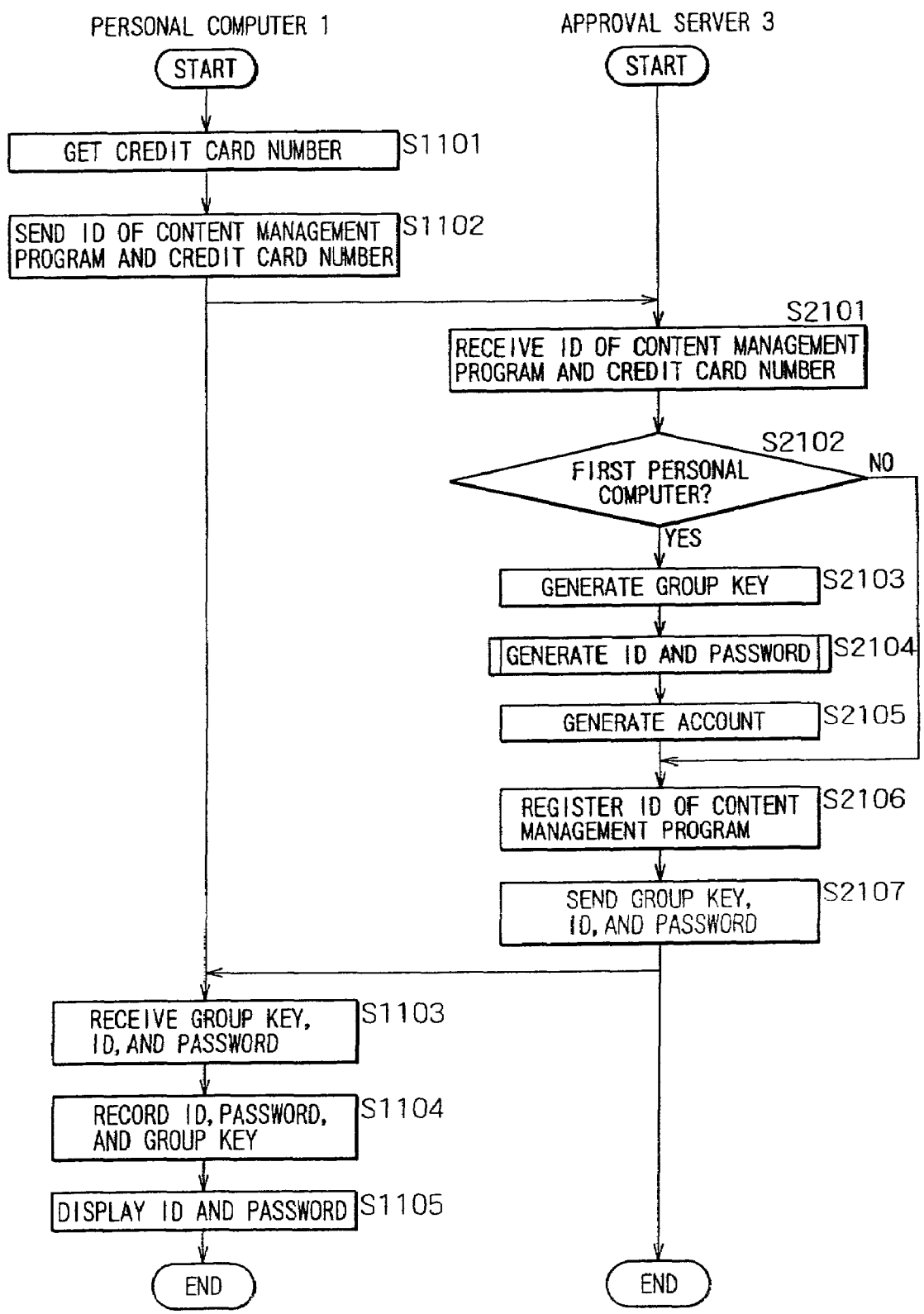
FIG. 12 is a flowchart describing the registration process.

The following describes the registration process by the personal computer 1 which executes the group gateway program 61 and the approval server 3 with reference to the flowchart shown in FIG. 12.

In step S1101, the group gateway program 61 gets the credit card number input by the user at the keyboard 78, for example. In step S1102, the group gateway program 61 gets the ID from the content management program 51 and transmits this ID and the credit card number to the approval server 3 via the network 2.

In step S2101, the approval server 3 receives the ID of the content management program 51 and the credit card number from the personal computer 1. In step S2102, the approval server 3 determines on the basis of the received credit card number whether the personal computer 1 is the first one which belongs to the group. If the personal computer 1 is determined to be the first one, then the approval server 3 generates the group key 271 in step S2103. In step S2104, the approval server 3 generates the ID or password of the group which is the same as the credit card number.

In step S2105, the approval server 3 generates an account corresponding to the user, upon which the procedure goes to step S2106.

In step S2102, if the personal computer 1 is determined not to be the first one of the group, namely the second or subsequent one, then it is not necessary to generate the group key 271 and the account, upon which the procedure goes to step S2106, skipping steps S2103 through S2105.

In step S2106, the approval server 3 registers the ID of the content management program 51. In step S2107, the approval server 3 transmits the group key 271 and the group ID and password to the personal computer 1 via the network 2.

In step S1103, the group gateway program 61 receives the group key 271 and the group ID and password from the approval server 3. In step S1104, the group gateway program 61 records the group key 271 and the group ID and password. In step S1105, the group gateway program 61 displays the group ID and password on the display 80, upon which the registration process comes to an end.

Thus, by transmitting the ID of the content management program 51 and the credit card number to the approval server 3, the personal computer 1-1 can get the group key 271 and the group ID and password. On the other hand, when registering the personal computer 1-1, the approval server 3 gets the ID of the content management program 51 and the credit card number and records the obtained ID of the content management program 51 and credit card number along with the generated group ID and password.

Figure 13:
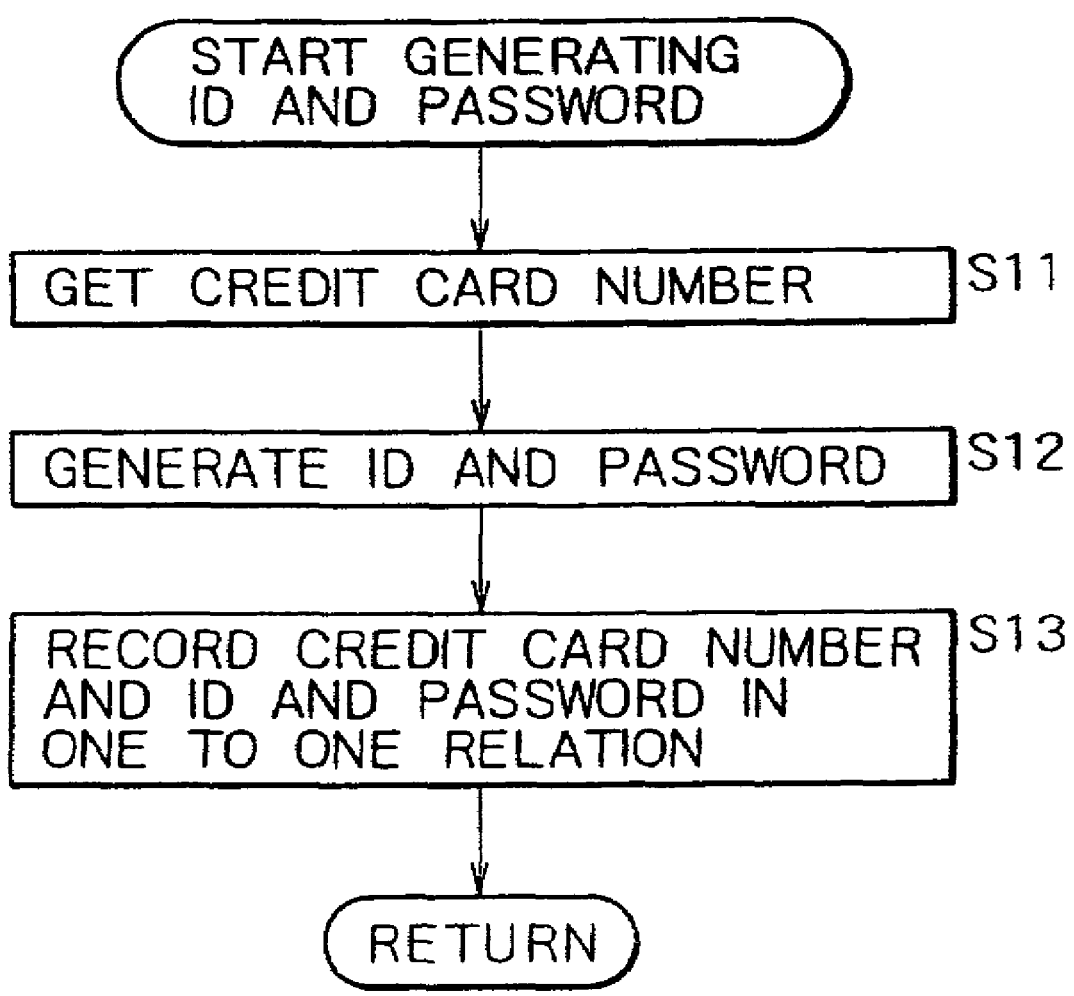
FIG. 13 is a flowchart describing one example of generating a group ID and password.

The following describes, with reference to the flowchart shown in FIG. 13, one example of the process for generating the group ID and password corresponding to the process of step S2104 shown in FIG. 12.

In step 51, the approval server 3 gets the received credit card number. In step S12, the approval server 3 generates the group ID and password. In the process of step S12, the generated group ID or password is the same as the credit card number.

In step S13, the approval server 3 records the credit card number and the group ID and password in a corresponding manner, upon which the group ID and password generation process comes to an end.

Thus, because the group ID or password generated by the approval server 3 is the same as the credit card number, the group ID and password are protected against disclosure to any third parties.

Figure 14:
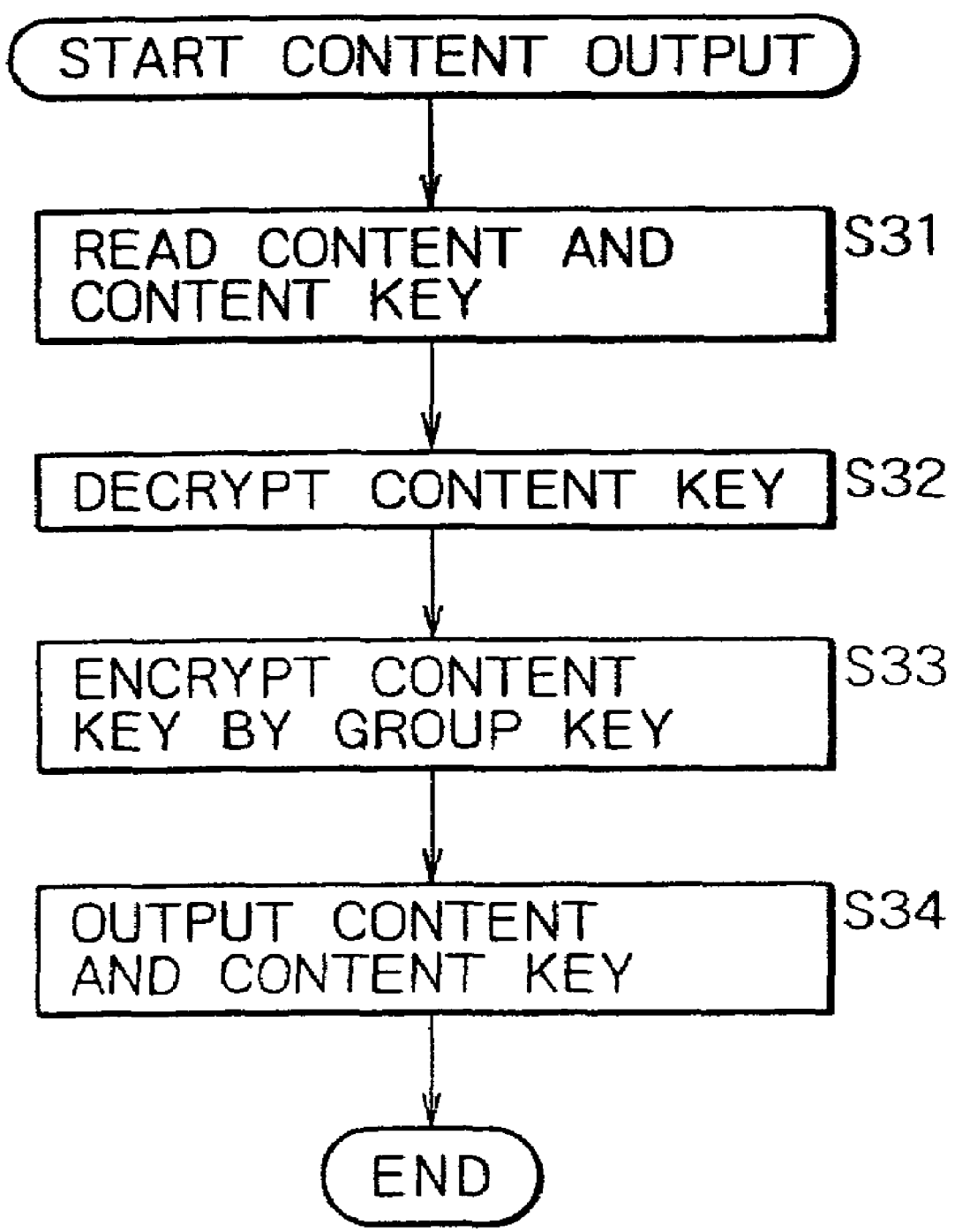
FIG. 14 is a flowchart describing outputting of content.

The following describes the process of outputting content of the personal computer 1 with reference to the flowchart shown in FIG. 14.

In step S31, the content management program 51 reads content 251 and the content key 252 from the content database 53. The content 251 is encrypted by its content key. The content key 252 is encrypted by the storage key 253.

In step S32, the content management program 51 decrypts the content key 252 by the stored storage key 253. The content management program 51 supplies the content 251 encrypted by the content key and a plaintext content key to the group gateway program 61.

In step S33, the group gateway program 61 encrypts the content key by the stored group key 271 to generate the content key 272.

In step S34, the group gateway program 61 outputs the content 251 encrypted by the content key and the content key 272 encrypted by the group key 271, upon which the processing comes to an end.

Thus, the personal computer 1 can output the content 251 encrypted by the content key and the content key 272 encrypted by the group key 271.

Figure 15:
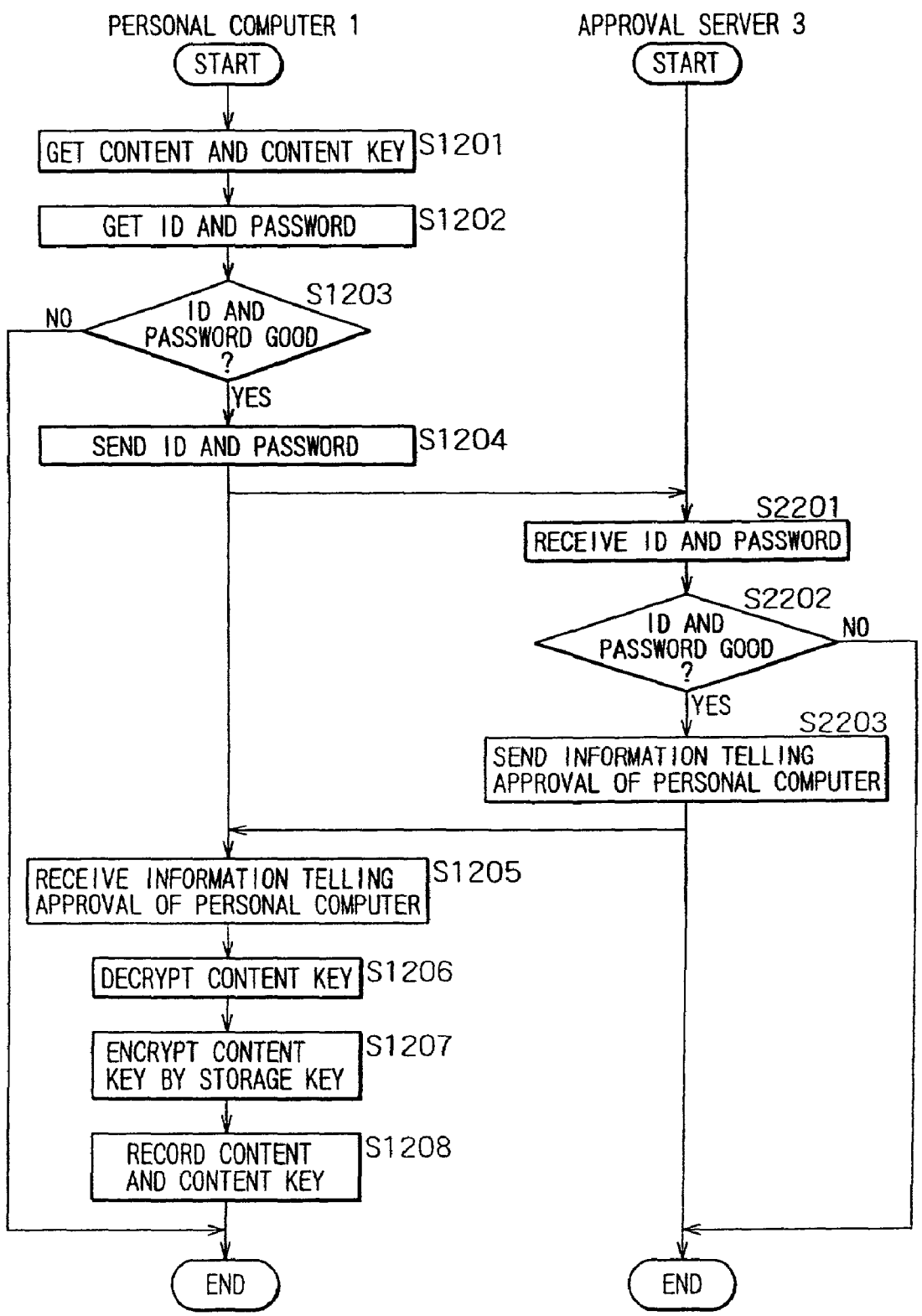
FIG. 15 is a flowchart describing importing of content.

The following describes the process of importing the content 251 of the personal computer 1 with reference to the flowchart shown in FIG. 15. In step S1201, the group gateway program 61 gets the content 251 encrypted by its content key and the content key 272 encrypted by the group 271 via the network 2 or a storage medium such as the magneto-optical disk 93, for example. In step S1202, the group gateway program 61 gets the group ID and password in response to the user operation made at the keyboard 78, for example.

In step S1203, the group gateway program 61 determines on the basis of the stored group ID and password whether the group ID and password obtained in step S1202 are valid. If the group ID and password are determined to be valid, then the group gateway program 61 transmits the group ID and password to the approval server 3 via the network 2 in step S1204.

In step S2201, the approval server 3 receives the group ID and password from the personal computer 1. In step S2202, the approval server 3 determines on the basis of the recorded group ID and password whether the group ID and password received in step S2201 are valid. If the group ID and password are determined to be valid, then the approval server 3 transmits information for approving the personal computer 1 via the network 2 in step S2203.

In step S1205, the group gateway program 61 receives the approval information from the approval server 3. In step S1206, the group gateway program 61 decrypts the content key 272 by the group key 271. The group gateway program 61 supplies the decrypted content key to the content management program 51. In step S1207, the content management program 51 encrypts the content key by the storage key 253. In step S1208, the content management program 51 records the content 251 encrypted by the content key and the content key 252 encrypted by the storage key 253 in the content database 53, upon which the import process comes to an end.

If the group ID and password are determined to be invalid in step S1203, the import of the content 251 cannot be permitted, so that the import process comes to an end without recording the content 251 into the content database 53.

If the group ID and password are determined to be invalid in step S2202, the personal computer 1 cannot be approved, so that the process comes to an end without recording the content 251 into the content database 53.

Thus, the personal computer 1 imports the content 251 only when the correct ID and password have been input by the user and the personal computer 1 has been approved by the approval server 3.

Figure 16:
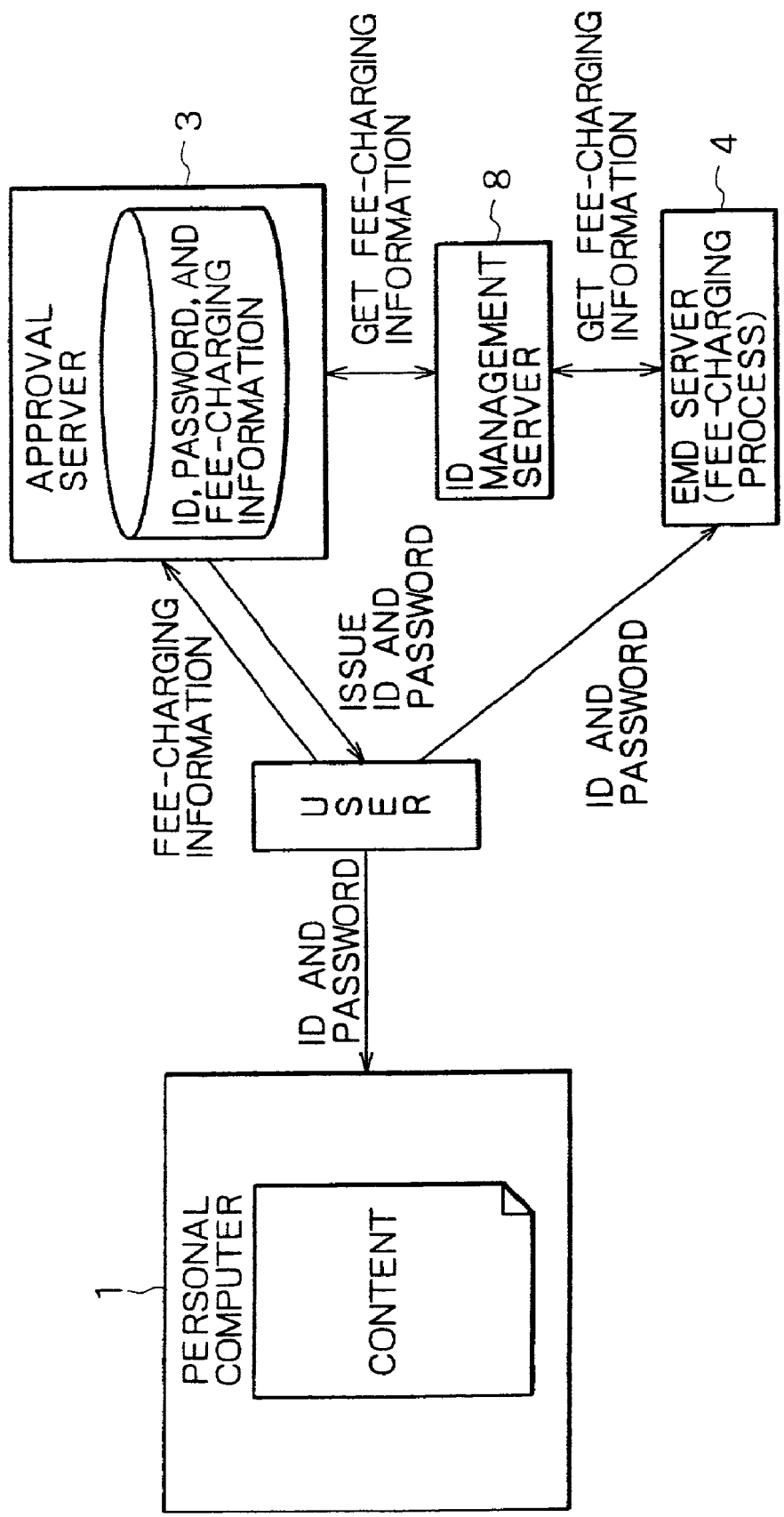
FIG. 16 is a schematic diagram illustrating another example of managing a group ID and password.

Referring to FIG. 16, there is shown a schematic diagram illustrating another example of the management of the group ID and password.

In the registration process, the personal computer 1 transmits the fee-charging information, such as the credit card number, to the approval server 3. The approval server 3 transmits the received credit card number to the ID management server 8 and gets the group ID and password from the ID management server 8.

Receiving the credit card number from the approval server 3 for the first time, the ID management server 8 generates the group ID and password including the credit card number and stores the resultant group ID and password in correspondence with the credit card number, while transmitting the group ID and password to the approval server 3. The ID management server 8, if the credit card number received from the approval server 3 is already stored (for example, if the credit card number is already stored by the EMD server 4), transmits the ID and password stored in correspondence with the credit card number to the approval server 3 as the group ID and password.

The approval server 3 transmits the group ID and password to the personal computer 1.

Receiving the credit card number from the EMD server 4 for the first time, the ID management server 8 generates the ID and password including the credit card number and stores the resultant group ID and password in correspondence with the credit card number, while transmitting the group ID and password to the EMD server 4. The ID management server 8, if the credit card number received from the EMD server 4 is already stored (for example, if the credit card number is already stored by the approval server 3), transmits the ID and password stored in correspondence with the credit card number to the EMD server 4.

The EMD server 4 transmits the ID and password to the personal computer 1.

Consequently, registration of the group ID and password with the approval server 3 and then with the EMD server 4 or vice versa causes the group ID and password to become the same as the ID and password registered with the EMD server 4.

Therefore, each user who knows the group ID and password can purchase content from the EMD server 4 only by entering the group ID and password. The EMD server 4 which sold content reads the credit card number from the ID management server 8 by referencing the input group ID and password and executes the fee-charging process for the content purchase.

If the ID or password of a group is disclosed to a third party, the possibility that the users belonging to the group will suffer unexpected disadvantages increases. Therefore, the user of the personal computer 1 belonging to the group does not disclose the ID and password of the group to any third parties. This makes it practicable for the content output from the personal computer 1 to be used by a plurality of devices without being exposed to unauthorized usage.

The following describes the registration process to be executed when the ID management server 8 generates the ID and password with reference to the flowchart shown in FIG. 17.

In step S1301, the group gateway program 61 gets the credit card number input by the user at the keyboard 78, for example. In step S1302, the group gateway program 61 gets the ID from the content management program 51 and transmits the ID and the credit card to the approval server 3 via the network 2.

In step S2301, the approval server 3 receives the ID of the content management program 51 and the credit card number from the personal computer 1. In step S2302, the approval server 3 determines on the basis of the credit card number whether the personal computer 1 is the first one of the group. If the personal computer 1 is determined to be the first one, then the approval server 3 generates the group key 271 in step S2303. In step S2304, the approval server 3 transmits the credit card number to the ID management server 8 via the network 2.

In step S3301, the ID management server 8 receives the credit card number. In step S3302, the ID management server 8 executes the process of generating the ID and password. In step S3303, the ID management server 8 transmits the generated ID and password to the approval server 3 via the network 2.

In step S2305, the approval server 3 receives the ID and password. In step S2306, the approval server 3 generates the account for the user, upon which the procedure goes to step S2307.

In step S2302, if the personal computer 1 is determined not to be the first one of the group, namely the second or subsequent one, then it is not necessary to generate the group key 271 and the account, upon which the procedure goes to step S2307, skipping steps S2303 through S2306.

The process of each of steps S2307 through S1305 is the same as the process of each of steps S2106 through S1105, so that their descriptions will be skipped.

Figure 18:
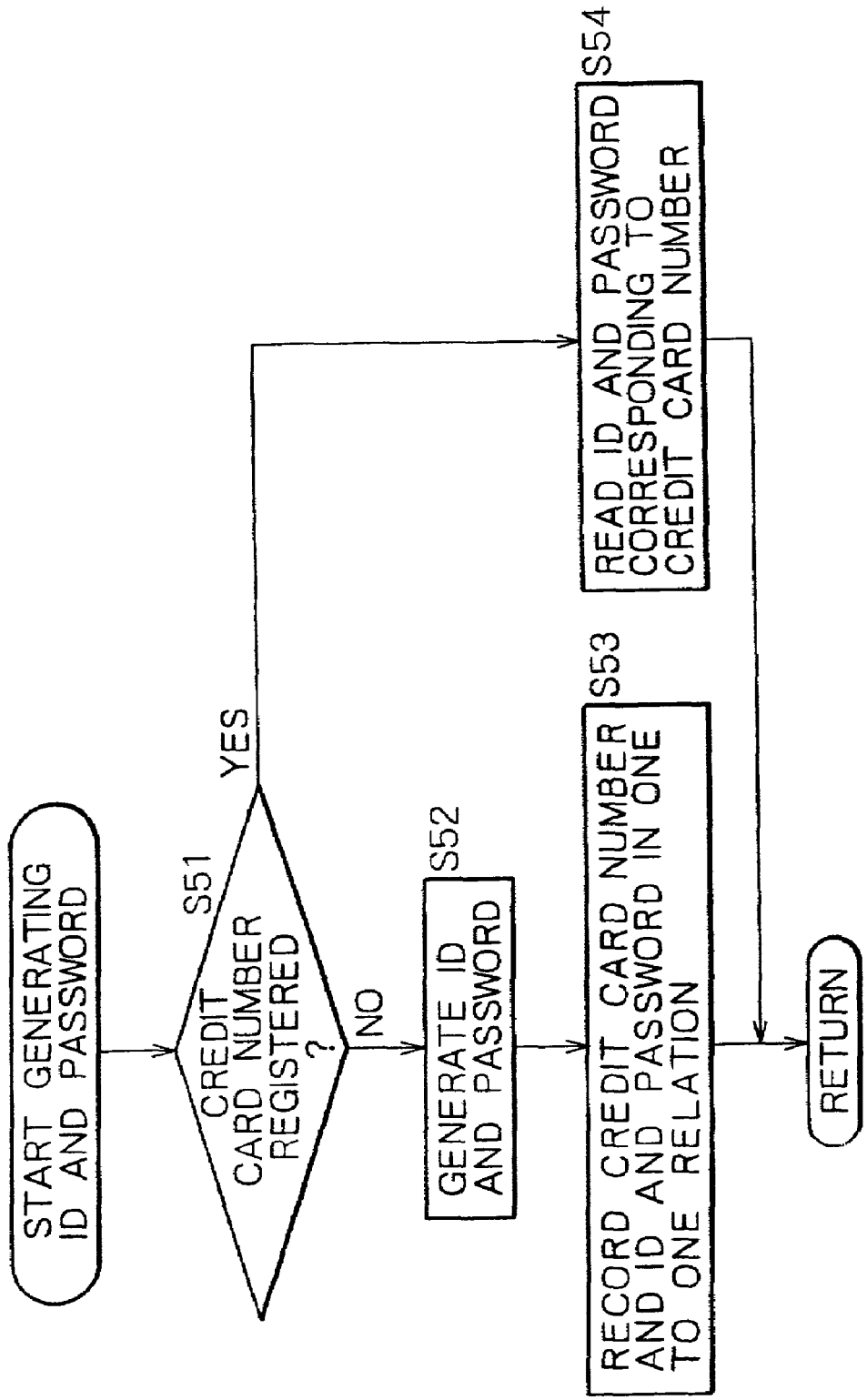
FIG. 18 is a flowchart describing the process of generating an ID and password by an ID management server.

The following describes, with reference to the flowchart shown in FIG. 18, the process of generating ID and password by the ID management server 8 corresponding to the process of step S3302 shown in FIG. 17.

In step S51, the ID management server 8 determines whether or not the credit card number received by the reception process has been registered. If the credit card number is determined to be not registered, then the ID management server 8 generates the ID and password in step S52. In the process of step S52, the generated ID or password is the same as the credit card number.

In step S53, the ID management server 8 records the credit card number and the ID and password in a corresponding manner, upon which the processing comes to an end.

If the credit card number is determined to be registered in step S51, then the ID management server 8 reads the ID and password which are recorded in correspondence with the credit card number in step S54, upon which the processing comes to an end.

Figure 19:
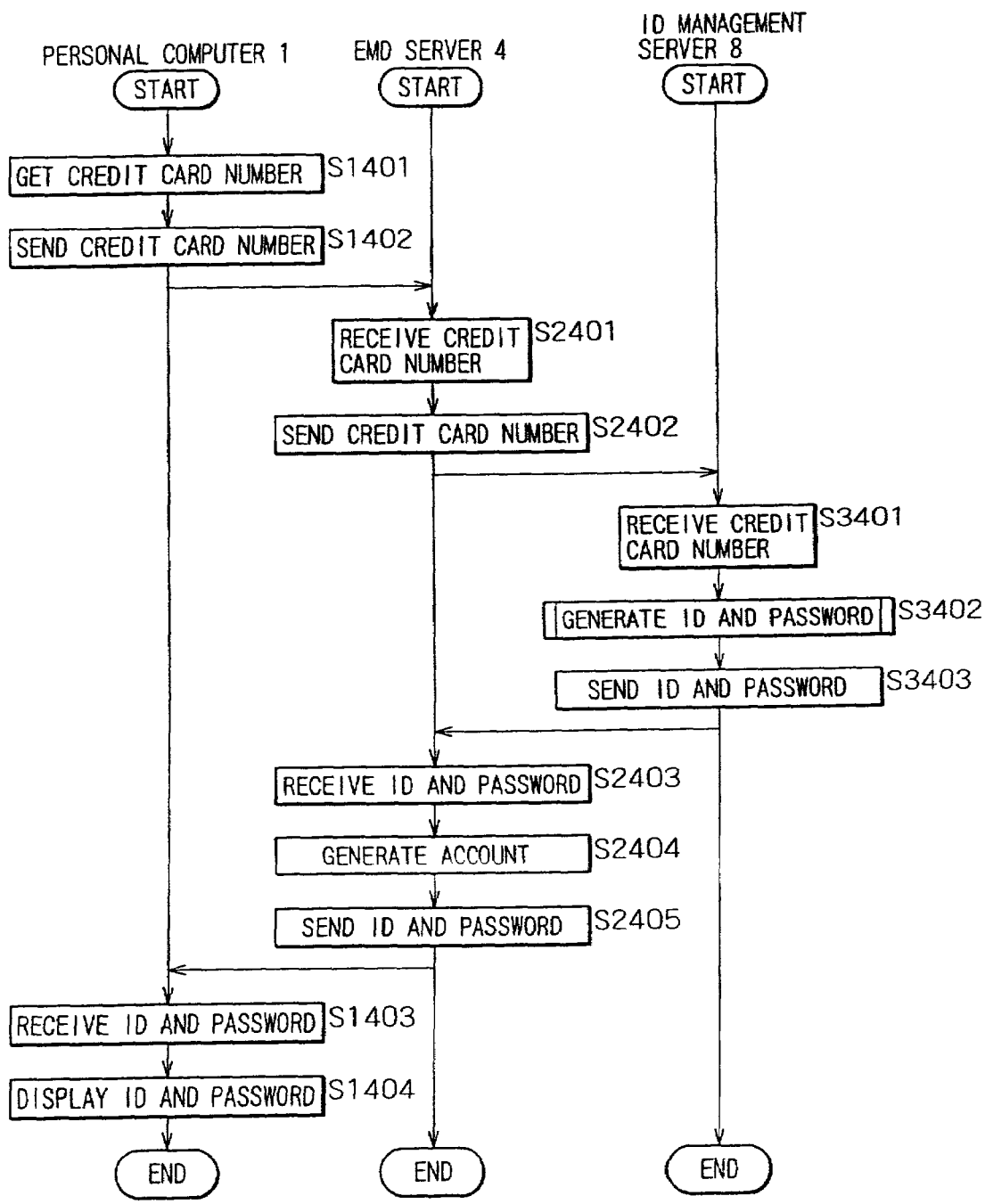
FIG. 19 is a flowchart describing a registration process by the personal computer and an EMD server.

The following describes the registration process to be executed by the personal computer 1 and the EMD server 4 with reference to the flowchart shown in FIG. 19. In step S1401, the personal computer 1 gets the credit card number in response to the operation performed by the user at the keyboard 78, for example. In step S1402, the personal computer 1 transmits the credit card number to the EMD server 4 via the network 2.

In step S2401, the EMD server 4 receives the credit card number from the personal computer 1. In step S2402, the EMD server 4 transmits the credit card number to the ID management server 8 via the network 2.

In step S3401, the ID management server 8 receives the credit card number from the EMD server 4. In step S3402, the ID management server 8 generates the ID and password. The details of the process of step S3402 are the same as the process described with reference to the flowchart shown in FIG. 18, so that their description will be skipped.

In step S3403, the ID management server 8 transmits the ID and password to the EMD server 4 via the network 2.

In step S2403, the EMD server 4 receives the ID and password. In step S2404, the EMD server 4 generates an account. In step S2405, the EMD server 4 transmits the ID and password to the personal computer 1 via the network 2.

In step S1403, the personal computer 1 receives the ID and password. In step S1404, the personal computer 1 displays the received ID and password, upon which the processing comes to an end.

Thus, the group ID and password to be issued by the approval server 3 can be made the same as the ID and password to be issued by the EMD server 4.

Figure 20:
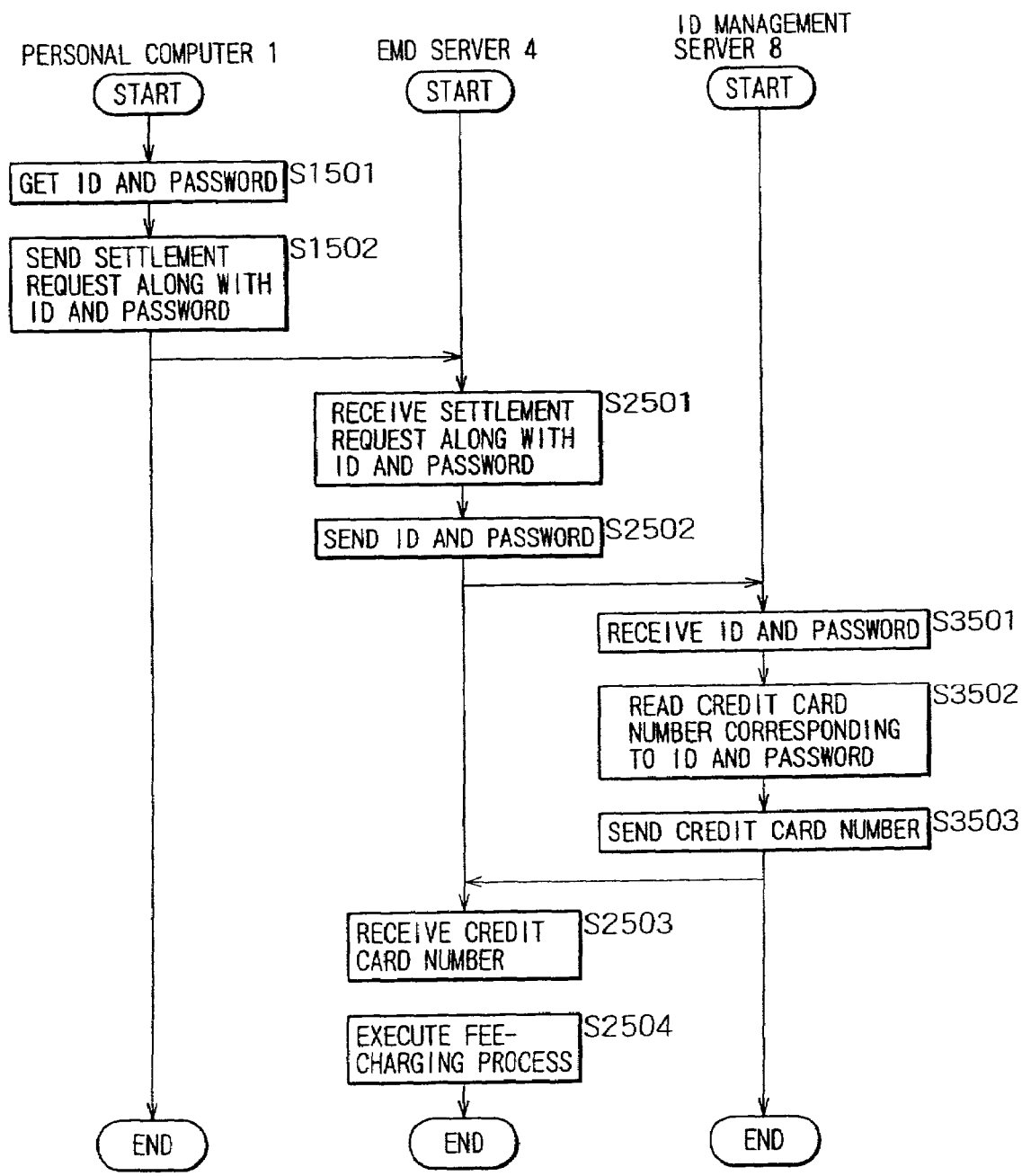
FIG. 20 is a flowchart describing accounting settlement processing.

The following describes the process of settlement to be executed when content has been purchased from the EMD server 4 with reference to the flowchart shown in FIG. 20. In step S1501, in response to the operation performed by the user at the keyboard 78, for example, the personal computer 1 gets the group ID and password or the ID and password registered with the EMD server 4. In step S1502, the personal computer 1 transmits a settlement request to the EMD server 4 along with the ID and password via the network 2.

In step S2501, the EMD server 4 receives the ID and password and the settlement request from the personal computer 1. In step S2502, the EMD server 4 transmits the ID and password to the ID management server 8 via the network 2.

In step S3501, the ID management server 8 receives the ID and password from the EMD server 4. In step S3502, the ID management server 8 reads the credit card number which corresponds to the received ID and password. In step S3503, the ID management server 8 transmits the retrieved credit card number to the EMD server 4 via the network 2.

In step S2503, the EMD server 4 receives the credit card number from the ID management server 8. In step S2504, the EMD server 4 executes a fee-charging process on the basis of the received credit card number, upon which the settlement process comes to an end.

Thus, the EMD server 4 can execute a fee-charging process by use of the group ID and password or the ID and password registered with the EMD server 4.

Figure 21:
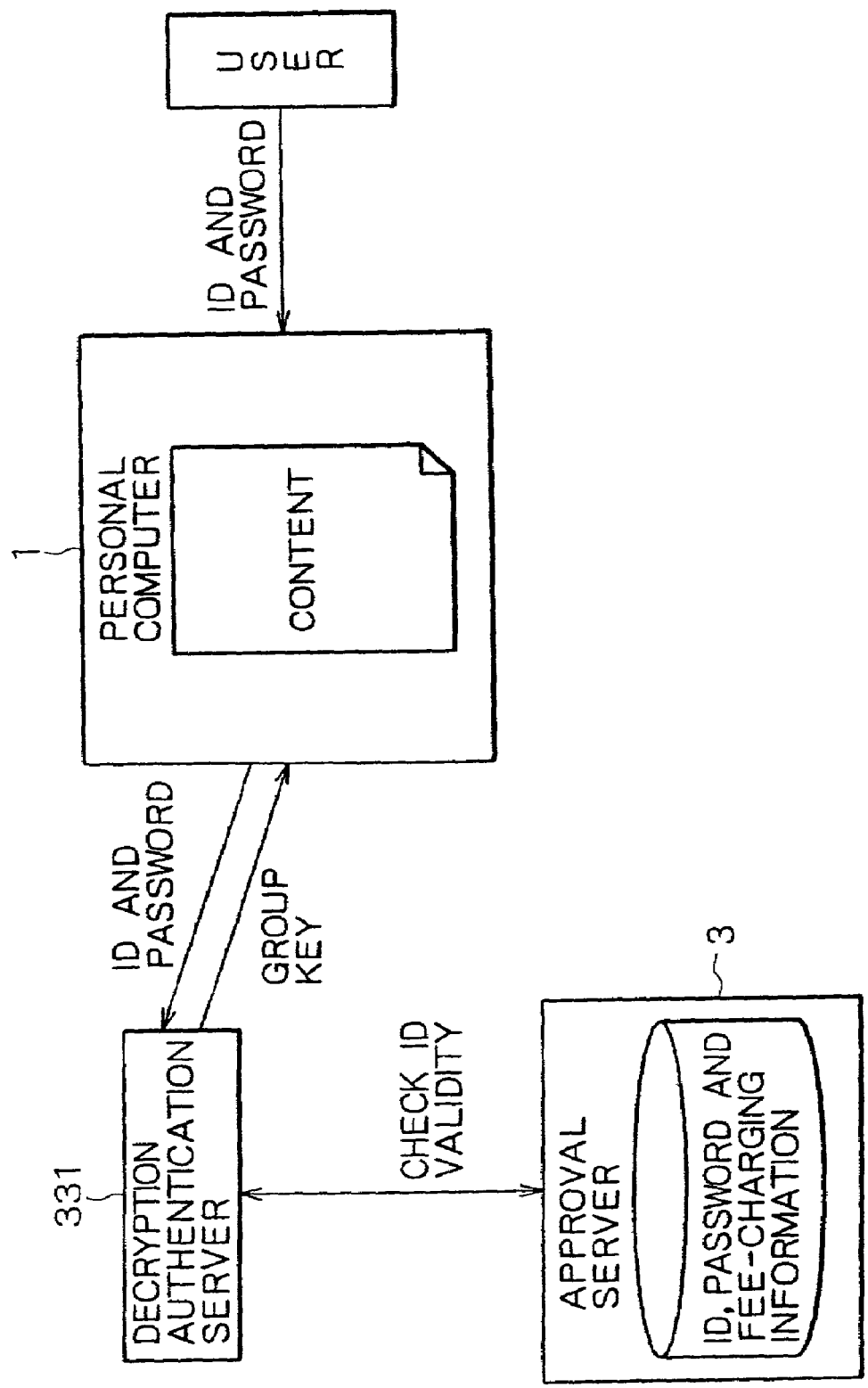
FIG. 21 is a schematic diagram illustrating another processing operation of importing content.

The following describes another process in which the personal computer 1 imports content with reference to FIG. 21.

In this example, when the registration has been made with the approval server 3, the group gateway program 61 of the personal computer 1 does not get the group key but gets only the group ID and password.

When the import of content 251 is requested and the group ID and password are entered by the user, the group gateway program 61 transmits the group ID and password to a decryption authentication server 331 via the network 2. Receiving the group ID and password from the personal computer 1, the decryption authentication server 331 transmits the group ID and password to the approval server 3.

Receiving the group ID and password from the decryption authentication server 331, the approval server 3 determines on the basis of the stored group ID and password whether the received group ID and password are valid. The approval server 3 transmits the result of this determination to the decryption authentication server 331.

If the group ID and password are determined to be valid, the decryption authentication server 331 generates the group key 271 on the basis of the group ID and password and transmits the generated group key 271 to the personal computer 1 via the network 2.

On the other hand, if the group ID and password are determined to be invalid, the decryption authentication server 331 ends the processing without generating the group key 271.

Thus, if the generation of the group key 271 is requested on the basis of the group ID and password which are invalid for some reason or other, the decryption authentication server 331 will not generate the group key 271.

Further, every time content is decrypted, the decryption authentication server 331 generates the group key 271, so that the decryption authentication server 331 can know the usage situation of the content.

As described, the group gateway program 61 does not hold the group key 271 and does not have a procedure for generating the group key 271, so that the personal computer 1 can more firmly prevent the unauthorized import of content.

Figure 22:
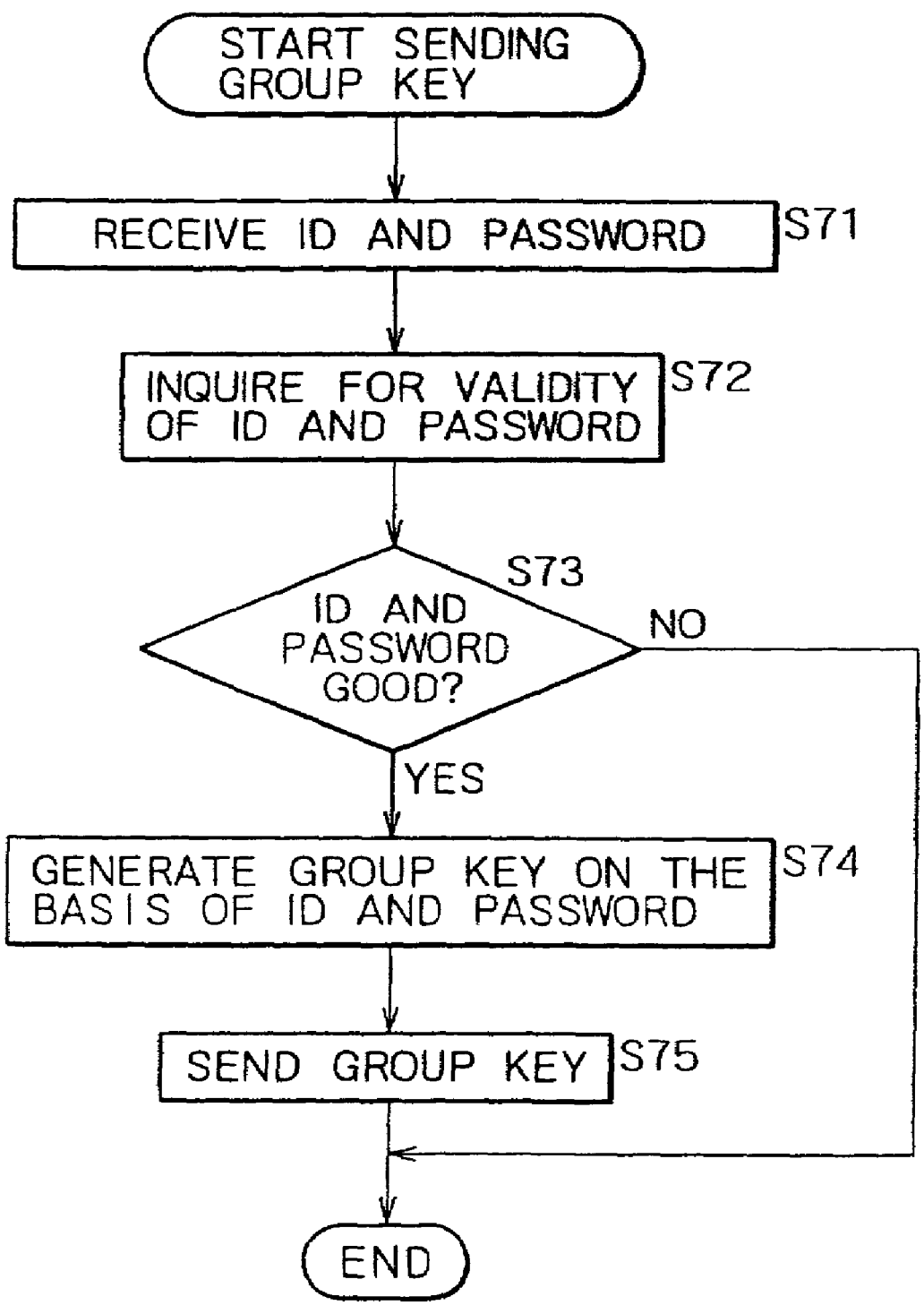
FIG. 22 is a flowchart describing the process of transmitting a group key.

The following describes the process of transmission of the group key 271 to be executed by the decryption authentication server 331 with reference to the flowchart shown in FIG. 22. In step S71, the decryption authentication server 331 receives the group ID and password from the personal computer 1 via the network 2. In step S72, the decryption authentication server 331 transmits the group ID and password to the approval server 3 to ask if the group ID and the password are valid. The approval server 3 transmits the information telling whether the group ID and password are valid to the decryption authentication server 331.

In step S73, the decryption authentication server 331 determines on the basis of the information received from the approval server 3 whether the group ID and password are valid. If the group ID and password are determined to be valid, the decryption authentication server 331 generates the group key 271 on the basis of the group ID and password in step S74. In step S75, the decryption authentication server 331 transmits the generated group key 271 to the personal computer 1 via the network 2, upon which the processing comes to an end.

If the group ID and password are determined to be invalid in step S73, it indicates that the import cannot be permitted, so that the decryption authentication server 331 ends the processing without transmitting the group key 271 to the personal computer 1.

Thus, if the group ID and password received from the personal computer 1 are determined to be valid, the decryption authentication server 331 generates the group key 271 and transmits it to the personal computer 1; if the group ID and password are determined to be invalid, the decryption authentication server 331 does not generate the group key 271. Consequently, the personal computer 1 can import the content 251 only when the good group ID and password have been entered.

The following describes an operation of the locker server 11.

Figures 23, 24:
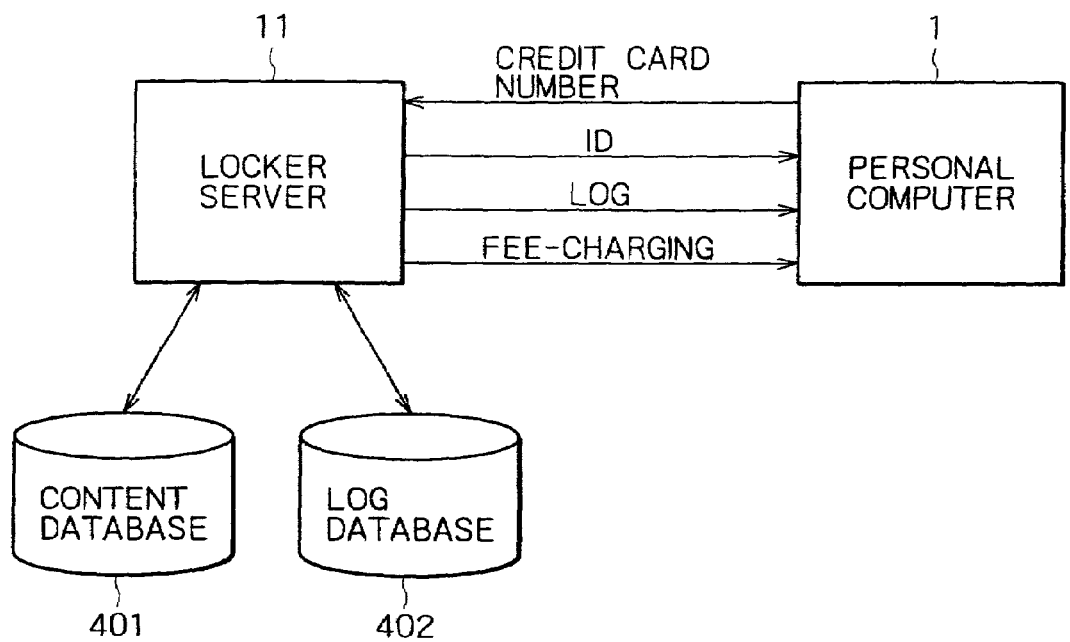
FIG. 23 is a schematic diagram illustrating the process of registration with a locker server.
FIG. 24 illustrates one example of a list of content stored in the locker server.

Referring to FIG. 23, there is shown a schematic diagram illustrating registration with the locker server 11. The locker server 11 is connected to a content database 401 and a log database 402.

The locker server 11 records content supplied from the personal computer 1 in the content database 401.

The content database 401 records the content received by the locker server 11 from the registered personal computer 1 and supplies the recorded content to the locker server 11 when requested thereby.

The locker server 11 transmits the content supplied from the content database 401 to the personal computer 1 via the network 2.

The log database 402 records a log of the registration of the personal computer 1 with the locker server 11 and the recording and retrieval of content.

When requesting the registration of the personal computer 1 with the locker server 11, the personal computer 1 transmits the credit card number to the locker server 11.

The locker server 11 generates an ID and records the generated ID in the log database 402 and, at the same time, transmits the generated ID to the personal computer 1. The ID generated by the locker server 11 is the same as the credit card number of the user of the personal computer 1, for example.

The locker server 11 transmits a log indicative of the registration of the personal computer 1 to the personal computer 1 and executes the process of fee-charging for the registration, transmitting a result thereof to the personal computer 1.

Referring to FIG. 24, there is shown a diagram illustrating a list of content items recorded in the locker server 11. As shown, the locker server 11 records the content names in association with the IDs of the registered users.

For example, the locker server 11 records content name "AAAAA" in correspondence with user ID "aaaaa," content name "BBBBB" in correspondence with user ID "bbbbb," and content name "CCCCC" in correspondence with user ID "ccccc."

Figure 25:
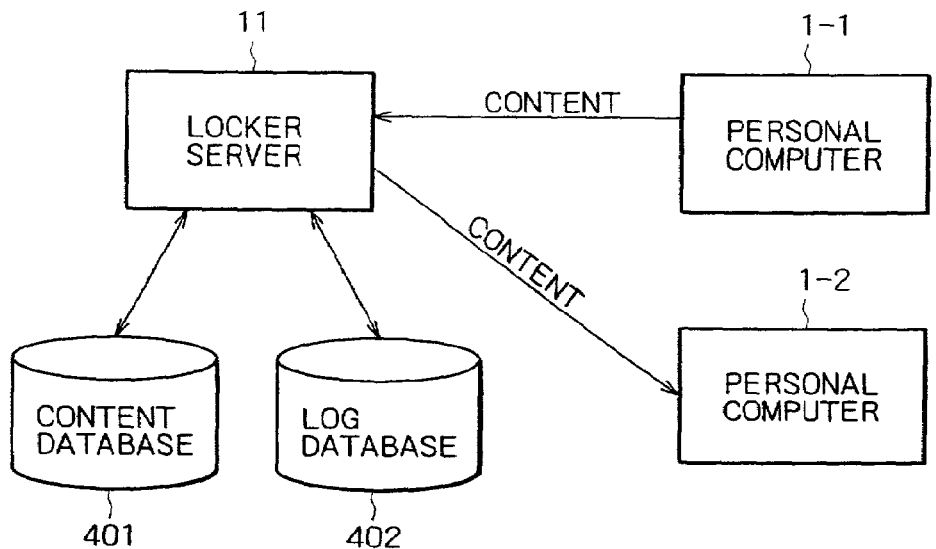
FIG. 25 is a schematic diagram illustrating one example of the shared use of content supported by the locker server.

Referring to FIG. 25, there is shown a schematic diagram illustrating a content sharing operation by the locker server 11. The locker server 11 records the content supplied from the personal computer 1-1 in the content database 401. Then, the locker server 11 records the name of the content in the content list in correspondence with the ID of the user of the personal computer 1-1 and stores, in the log database 402, a log indicative of the recording of the content in the content database 401.

When the transmission of the content is requested from the personal computer 1-2 on the basis of the same ID as the personal computer 1-1, the locker server 11 determines on the basis of the content list whether the user ID is valid. If the user ID is determined to be valid, the locker server 11 asks the content database 401 to supply the content. The locker server 11 transmits the content supplied from the content database 401 to the personal computer 1-2. Then, the locker server 11 stores, in the log database 402, a log indicative of the supply of the content to the personal computer 1-2.

Figure 26:
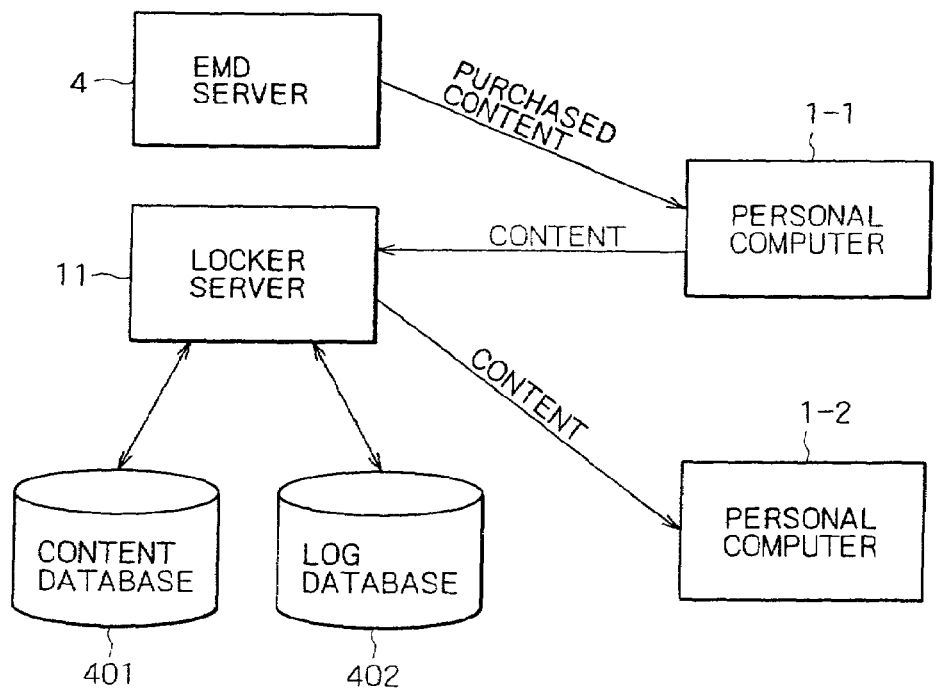
FIG. 26 is a schematic diagram illustrating another example of the shared use of content supported by the locker server.

As shown in FIG. 26, the personal computer 1-1 can also transmit the content purchased from the EMD server 4 to the locker server 11 to record the content in the content database 401. In this case, too, when the transmission of the content is requested by the personal computer 1-2, the locker server 11 asks, on the basis of the same ID as that of the personal computer 1-1, the content database 401 to supply the content and transmits the supplied content to the personal computer 1-2.

Figure 27:
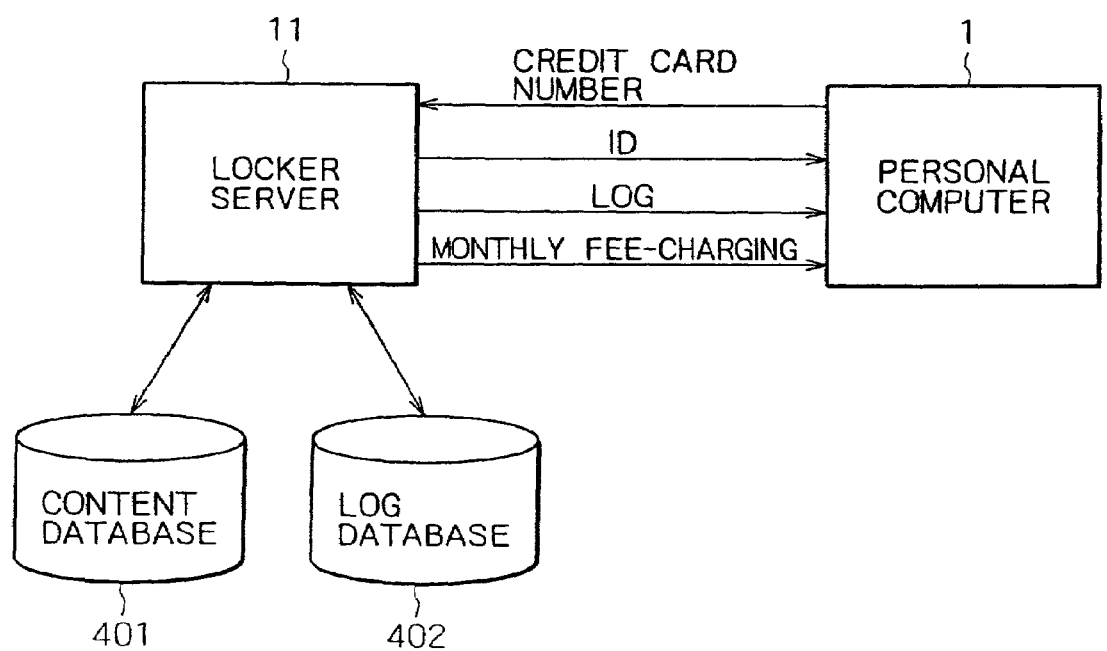
FIG. 27 is a schematic diagram illustrating fee-charging processing by the locker server.

As shown in FIG. 27, the locker server 11 may transmit a log indicative of the registration of the personal computer 1 to the personal computer 1 and, by executing monthly fee-charging for the registration, transmit a result of this execution to the personal computer 1.

Figure 28:
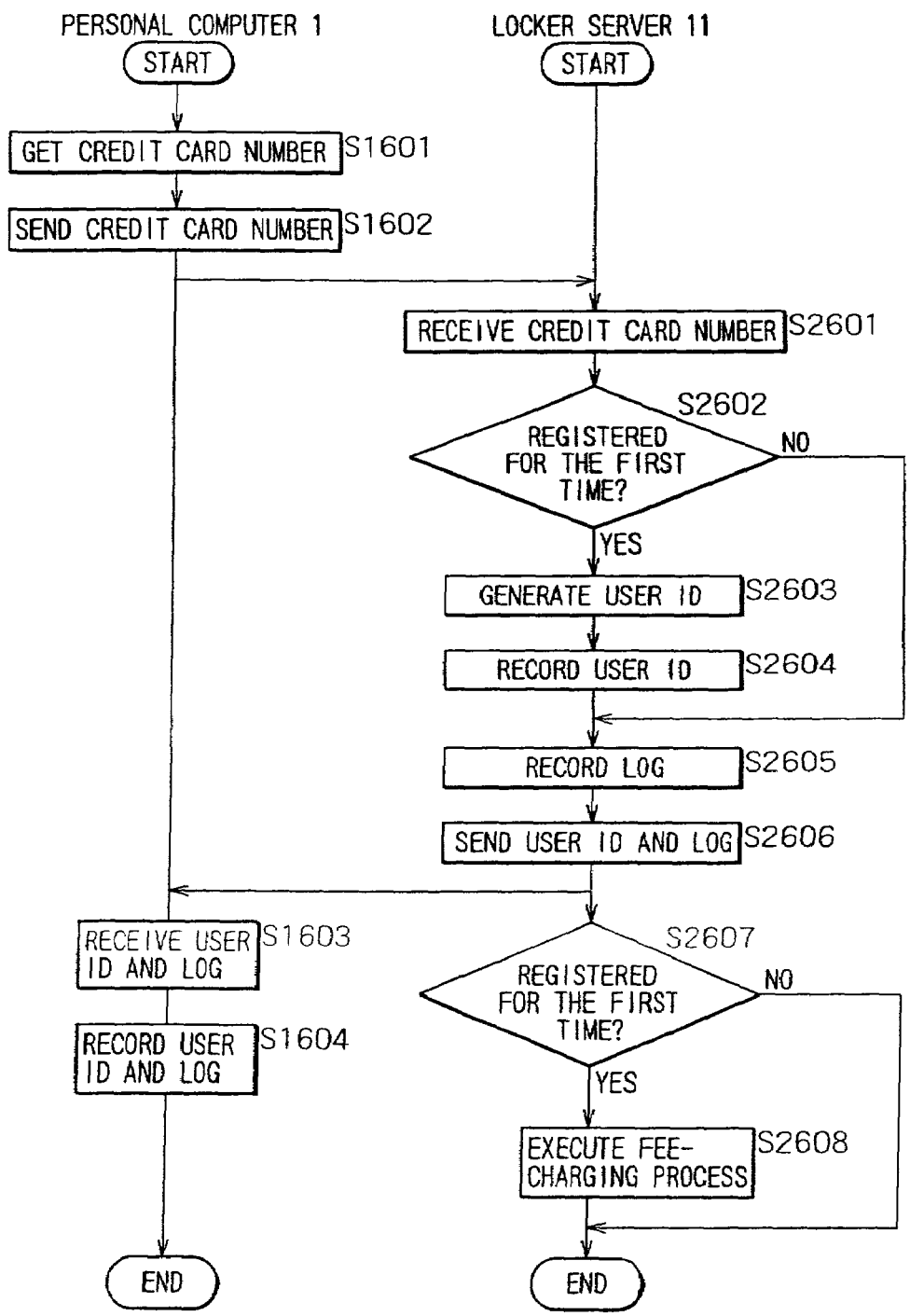
FIG. 28 is a flowchart describing registration processing by the personal computer and the locker server.

The following describes registration processing by the personal computer 1 and the locker server 11 with reference to the flowchart shown in FIG. 28.

In step S1601, the personal computer 1 gets the credit card number input by the user at the keyboard 78, for example. In step S1602, the personal computer 1 transmits the credit card number to the locker server 11 via the network 2.

In step S2601, the locker server 11 receives the credit card number from the personal computer 1. In step S2602, the locker server 11 determines on the basis of the received credit card number whether the registration has been made for the first time. If the registration is determined to be made for the first time, the locker server 11 generates the user ID in step S2603. In step S2604, the locker server 11 records the generated user ID, upon which the procedure goes to step S2605.

If the registration is determined not to be made for the first time in step S2602, the user ID need not be generated, so that the procedure goes to step S2605, skipping steps S2603 and S2604.

In step S2605, the locker server 11 records a log indicative of the registration of the user ID with the log data base 402. In step S2606, the locker server 11 transmits the user ID and the log to the personal computer 1 via the network 2.

In step S1603, the personal computer 1 receives the user ID and the log transmitted from the locker server 11. In step S1604, the personal computer 1 records the received user ID and log. In step S2607, the locker server 11 determines on the basis of the received credit card number whether the registration has been made for the first time. If the registration is determined to be made for the first time, the locker server 11 executes a fee-charging process on the basis of the received credit card number in step S2608, upon which the processing comes to an end.

If the registration is determined not to be made for the first time in step S2607, a fee-charging process is not required, so that step S2608 is skipped, upon which the processing comes to an end.

Thus, by transmitting the credit card number to the locker server 11, the personal computer 1 can get the user ID. On the other hand, when registering the personal computer 1, the locker server 11 can get the credit card number and record it along with the generated user ID.

Figure 29:
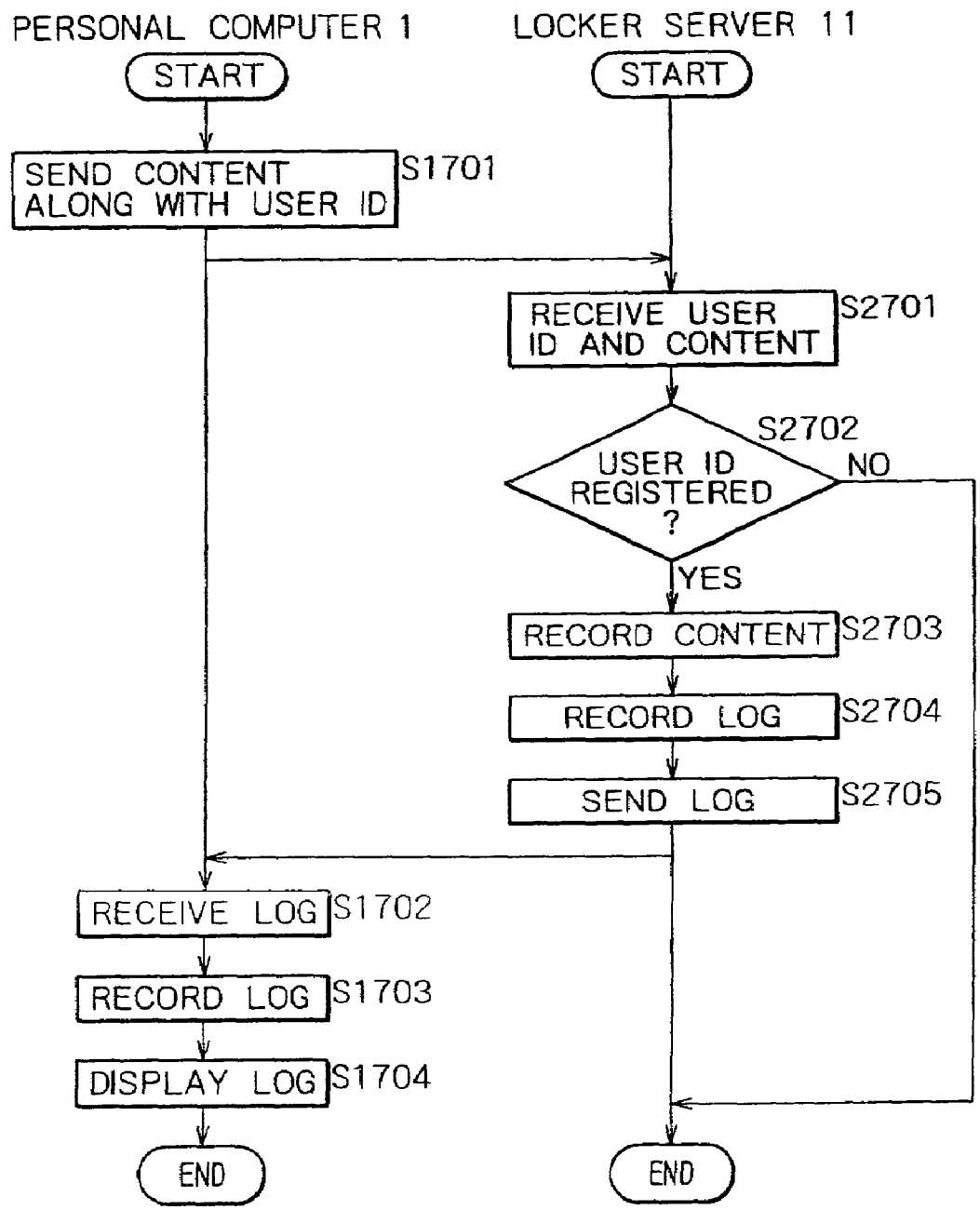
FIG. 29 is a flowchart describing the process of recording content to the locker server.

The following describes the process of recording content to the locker server 11 with reference to the flowchart shown in FIG. 29. In step S1701, the personal computer 1 transmits the content to the locker server 11 along with the user ID via the network 2.

In step S2701, the locker server 11 receives the content and the user ID transmitted from the personal computer 1. In step S2702, the locker server 11 determines on the basis of the user ID recorded in the list whether the received user ID has been registered. If the received user ID is determined to be registered, then the locker server 11 records the received content in the content database 401 in step S2703.

In step S2704, the locker server 11 records the log indicative of the recording of the content in the log database 402. In step S2705, the locker server 11 transmits the log indicative of the recording of the content to the personal computer 1 via the network 2.

In step S1702, the personal computer 1 receives the log indicative of the recording of the content from the locker server 11. In step S1703, the personal computer 1 records the received log. In step S1704, the personal computer 1 displays the received log on the display 80, upon which the processing comes to an end.

If the received user ID is determined not to be registered in step S2702, it indicates that the request for recording the content is unauthorized, so that the processing comes to an end without recording the content.

Thus, upon reception of the content with a valid ID, the locker server 11 stores the received content in the content database 401; upon reception of the content with an invalid ID, the locker server 11 discards the received content.

Figure 30:
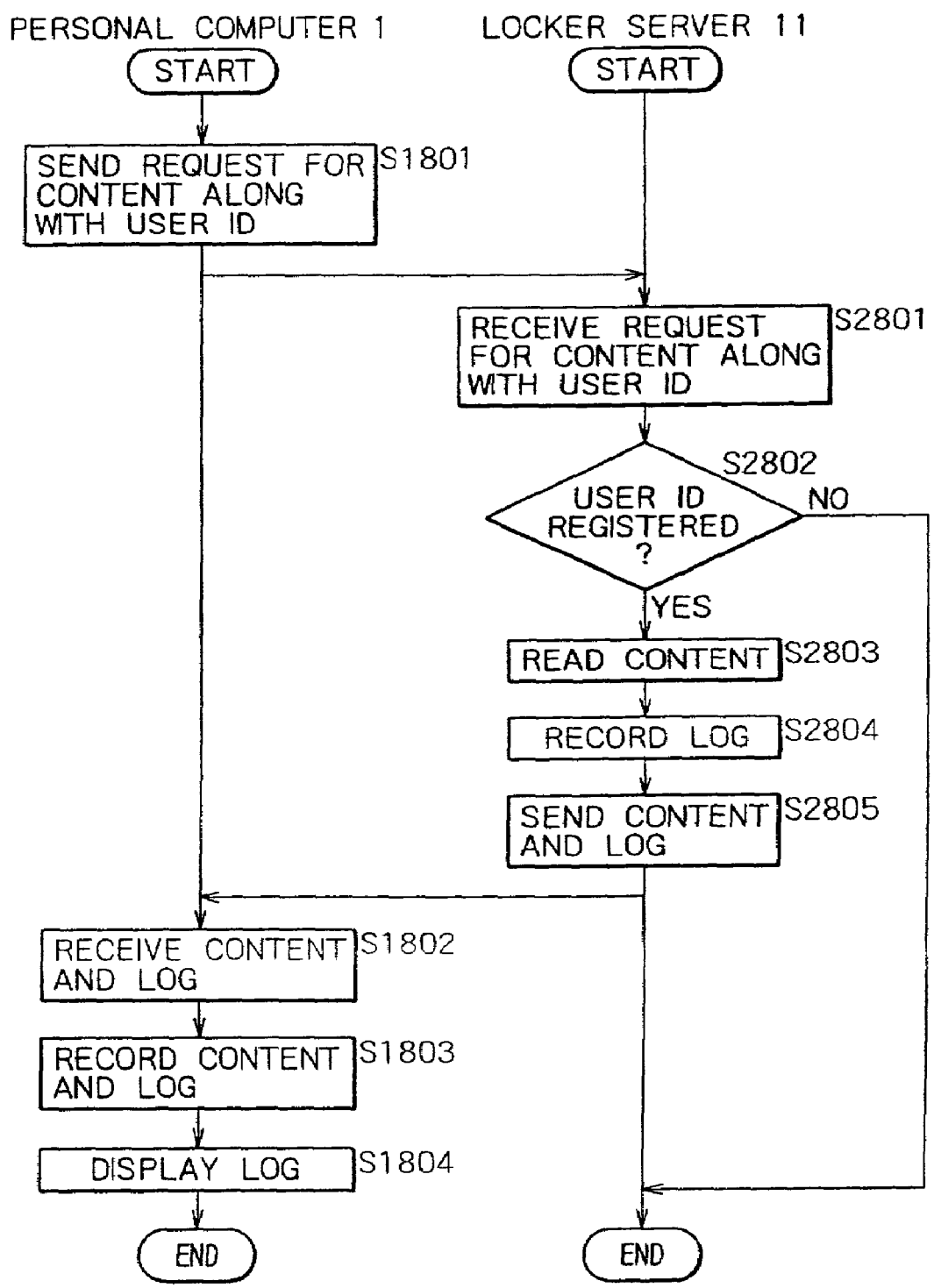
FIG. 30 is a flowchart describing the process of reading content from the locker server.

The following describes the retrieval of content from the locker server 11 with reference to the flowchart shown in FIG. 30. In step S1801, the personal computer 1 transmits a request for content to the locker server 11 along with the user ID via the network 2.

In step S2801, the locker server 11 receives the content request and the user ID transmitted from the personal computer 1. In step S2802, the locker server 11 determines on the basis of the recorded user ID whether the received user ID has been registered. If the received user ID is determined to be recorded, the locker server 11 reads the requested content from the content database 401 in step S2803.

In step S2804, the locker server 11 records a log indicative of the content retrieval in the log database 402. In step S2805, the locker server 11 transmits the retrieved content and the log indicative of the retrieval of the content to the personal computer 1 via the network 2.

In step S1802, the personal computer 1 receives the content and log transmitted from the locker server 11. In step S1803, the personal computer 1 records the received content and log. In step S1804, the personal computer 1 displays the received log on the display 80, upon which the processing comes to an end.

If the received user ID is determined not to be registered in step S2802, it indicates that the content request is unauthorized, so that the processing comes to an end without transmitting the content.

Thus, upon reception of the registered user ID and the request for content, the locker server 11 retrieves the requested content from the content database 401 and transmits the retrieved content; if the user ID has not been registered, the locker server 11 will not transmit the content.

The following describes a music data management system practiced as a second embodiment of the invention.

Figure 31:
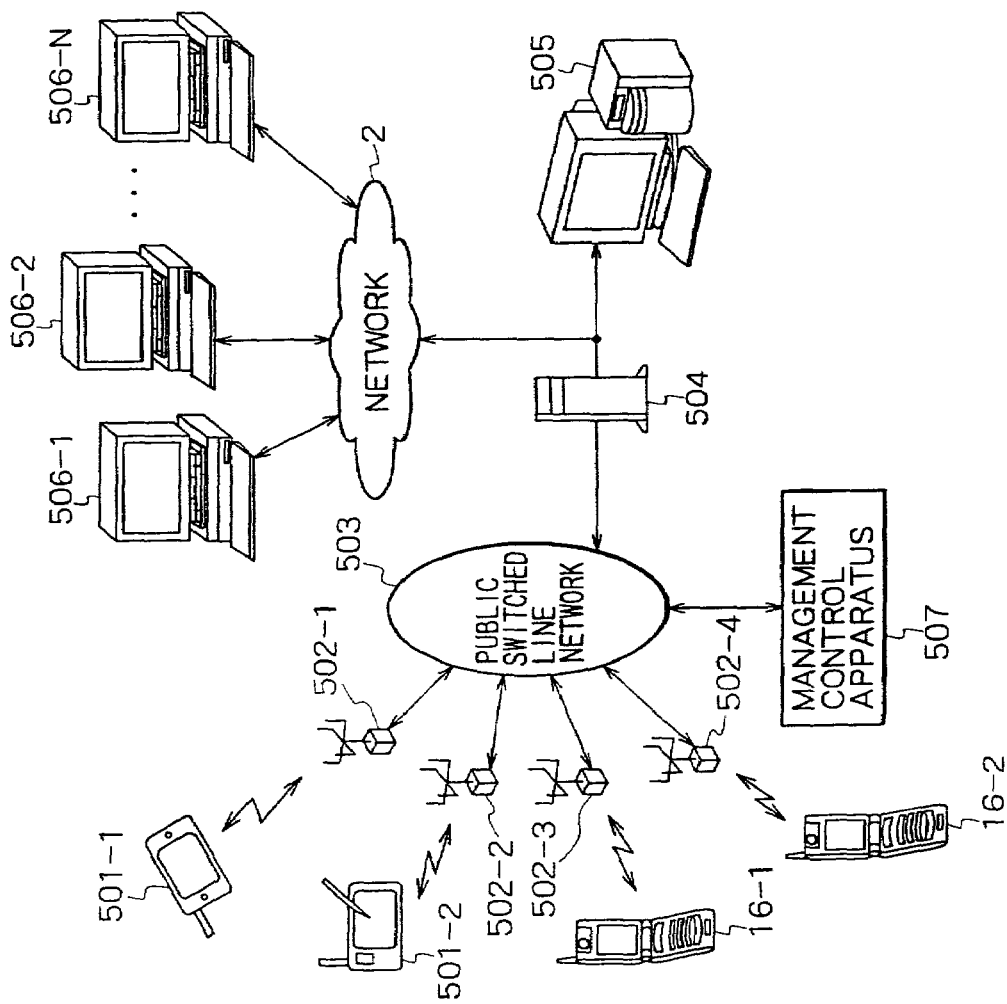
FIG. 31 is a schematic diagram illustrating a music data management system practiced as a second embodiment of the invention.

Referring to FIG. 31, there is shown the second embodiment of the invention. As shown, a public switched line network 503 is connected to PDAs 501-1 and 501-2 and camera mounted digital mobile telephones 16-1 and 16-2 via base stations 502-1 through 502-4, which are stationary wireless stations each arranged in each of the cells obtained by dividing a communication service area by a certain factor.

The base stations 502-1 through 502-4 are connected to the PDAs 501-1 and 501-2, which are mobile wireless stations, and the camera-mounted digital mobile telephones 161 and 16-2 in a wireless manner based on W-CDMA (Wideband Code Division Multiple Access), for example, to transfer mass data at speeds up to 2 Mbps by use of a 2-GHz frequency band.

The PDAs 501-1 and 501-2 and the camera-mounted digital mobile telephones 16-1 and 16-2 can transfer mass data at high speeds with the base stations 502-1 through 502-4, so that not only voice but also electronic mail transfer, simplified home page browsing, transfer of content-like images, and other various kinds of data communications can be executed.

The PDAs 501-1 and 501-2 and the camera-mounted digital mobile telephones 16-1 and 16-2 execute browser programs, the content management program 51, and group gateway program 61 to execute content management and content input/output processing.

The base stations 502-1 through 502-4 are connected to the public switched line network 503 with cables. The public switched line network 503 is connected to the Internet, the network 2, subscriber-wired terminal devices, not shown, a computer network, not shown, and a local area network, not shown, for example.

An access server 504 of an Internet service provider is connected to the public switched line network 503 and to a content server 505 owned by the Internet service provider.

In response to a request from a subscriber-wired terminal device, the PDA 501-1 or 501-2, or the camera-mounted digital mobile telephone 16-1 or 16-2, the content server 505 provides content, such as a simplified home page, for example, as a compact HTML (Hyper Text Markup Language) file.

The network 2 is connected to many WWW (World Wide Web) servers 506-1 through 506-N. The WWW servers 506-1 through 506-N are accessed from the subscriber wired terminal devices, the PDAs 501-1 and 501-2, and the camera-mounted digital mobile telephones 16-1 and 16-2 in accordance with TCP (Transmission Control Protocol/IP (Internet Protocol)).

The WWW servers 506-1 through 506-N execute generally the same processing as the approval server 3, the EMD server 4, the ID management server 8, and the locker server 11 to provide content, for example, to the PDAs 501-1 and 501-2 or the camera-mounted digital mobile telephones 16-1 and 16-2 via the network 2, record content, transmit content, and manage IDs.

The PDAs 501-1 and 501-2 and the camera-mounted digital mobile telephones 16-1 and 16-2 communicate with the base stations 502-1 through 502-4 by means of a simplified transport protocol of 2 Mbps and communicate between the base stations 502-1 through 502-4 and the network 2 and the WWW servers 506-1 through 506-N by means of TCP/IP.

It should be noted that a management control apparatus 507 is connected to the subscriber-wired terminal devices, the PDAs 501-1 and 501-2, and the camera-mounted digital mobile telephones 16-1 and 16-2 via the public switched line network 503, executing the authentication process and fee-charging process for the subscriber-wired terminal devices, the PDAs 501-1 and 501-2, and the camera-mounted digital mobile telephones 16-1 and 16-2.

The camera-mounted digital mobile telephones 16-1 and 16-2 use content by generally the same process as the personal computer 1 via the public switched line network 503 and the network 2.

In what follows, the camera-mounted digital mobile telephones 16-1 and 16-2 will be generically referred to simply as a camera-mounted digital mobile telephone 16 unless otherwise noted.

Figure 32:
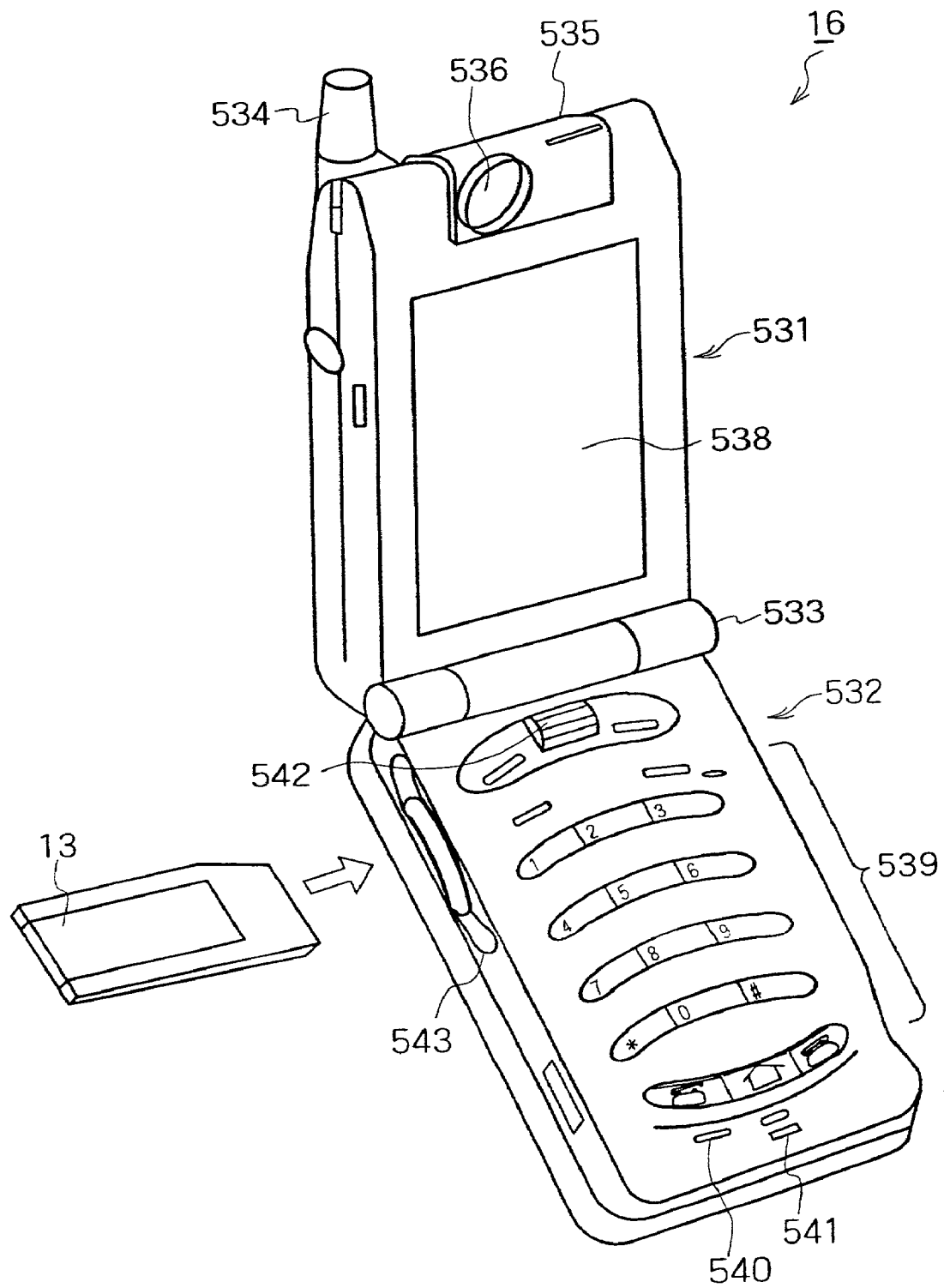
FIG. 32 is a perspective view of a camera-mounted digital mobile telephone.

The following describes the external configuration of the camera-mounted digital mobile telephone 16 to which the present invention is applied. As shown in FIG. 32, the camera-mounted digital mobile telephone 16 is composed of a display section 531 and a main body 532 which are pivotally connected with a hinge 533 in between.

The display section 531 has a retractable send/receive antenna 534 at its upper left corner. The digital mobile telephone 16 transmits and receives signals to and from the base stations 502-1 through 502-4, which are stationary wireless terminals, via the antenna 534.

The display section 531 has, on its top center, a camera section 535 which is pivotable within an angular range of about 180 degrees. The camera-mounted digital mobile telephone 16 takes pictures by a CCD camera 536 incorporated in the camera section 535.

Figure 33:
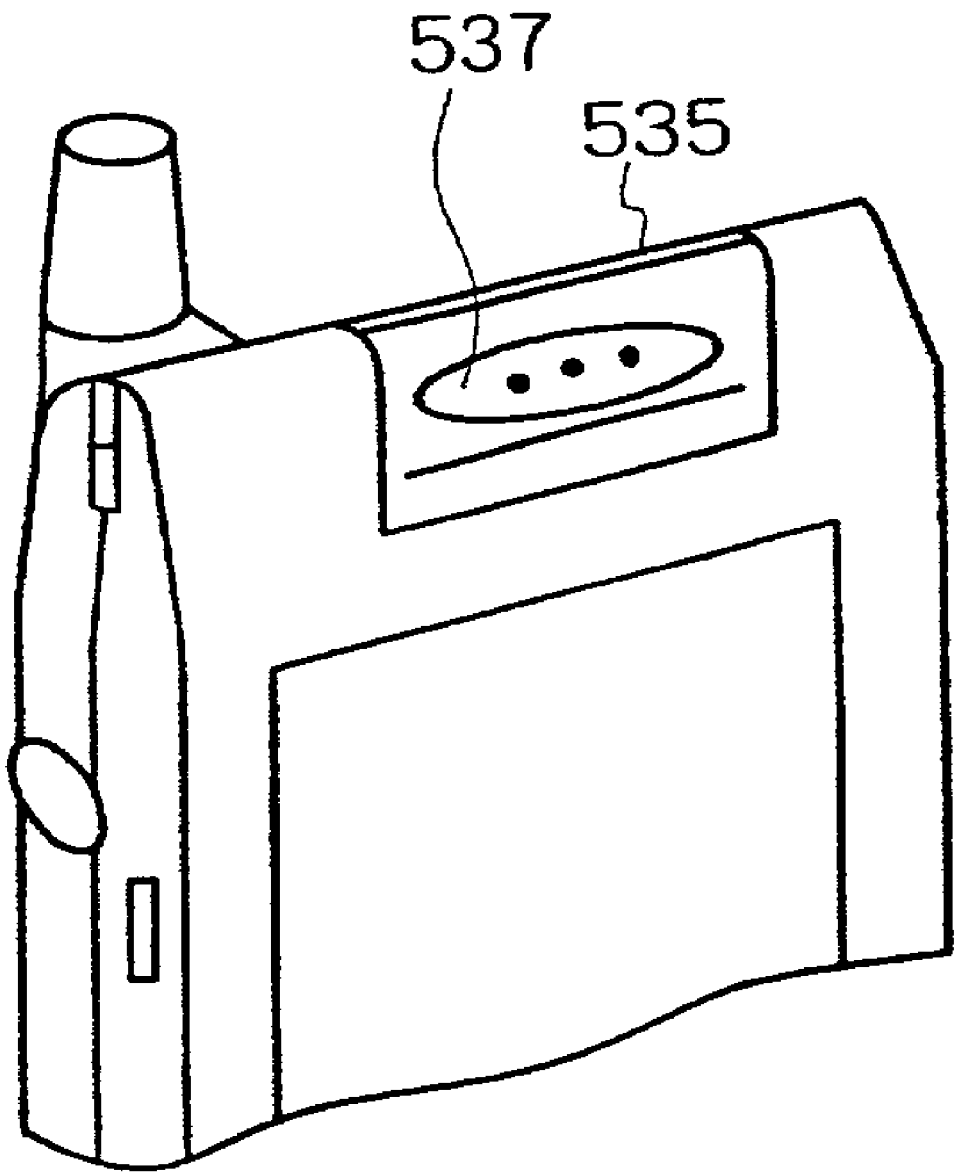
FIG. 33 is a partial perspective view of the camera-mounted digital mobile telephone.

When the camera section 535 is rotated by the user about 180 degrees, the display section 531 is positioned with a speaker 537 arranged at the rear center of the camera section 535 faced to the front side, as shown in FIG. 33. Thus, the camera-mounted digital mobile telephone 16 can be configured in the normal talk mode.

In addition, the display section 531 has a liquid crystal display 538 at the front center section. The liquid crystal display 538 displays the contents of electronic mail, a simplified home page, and an image taken by the CCD camera 536 of the camera section 535 in addition to radio wave reception status, battery remaining amount, and names and telephone numbers and a call log registered as a telephone directory.

On the other hand, the main body 532 has numeric keys "0" through "9", a call key, a redial key, a clear/power key, and other operator keys 539 on the front surface. Various commands are input from these operator keys 539 into the camera-mounted digital mobile telephone 16.

Below the operator keys 539 of the main body 532, a memo button 540 and a microphone 541 are arranged. When the memo button 540 is pressed, the camera-mounted digital mobile telephone 16 records the voice of the other party. The camera-mounted digital mobile telephone 16 picks up the voice of the user in the talk mode through the microphone 541.

In addition, a rotatable jog dial 542 is arranged over the operator keys 539 on the main body 532 in a manner in which the jog dial 542 is slightly projecting from the surface of the main body 532. In accordance with the rotary operation of the jog dial 542, the camera-mounted digital mobile telephone 16 executes the scrolling of a telephone directory list or electronic mail messages displayed on the liquid crystal display 538, the turning of the displayed pages of a simplified home page, and the feeding of displayed images, for example.

For example, the main body 532 selects a desired telephone number from among those in a telephone directory list displayed on the liquid crystal display 538 by the rotation of the jog dial 542 by the user and, when the jog dial 542 is pressed into the main body 532, enters the selected telephone number, thereby automatically originating a call to the party at the selected telephone number.

It should be noted that a battery pack, not shown, is loaded in the main body 532 at the rear side. When the clear/power key is turned on, power is supplied from the battery pack to each circuit, making the camera-mounted digital mobile telephone 16 ready for operation.

The main body 532 also has a Memory Stick (trademark) slot 543 at the upper left side in which the detachable memory card 13 is loaded. When the memo button 540 is pressed, the camera-mounted digital mobile telephone 16 records the voice of the other party onto the loaded memory card 13. In accordance with the operation of the user, the camera-mounted digital mobile telephone 16 records an electronic mail message, a simplified home page, or an image taken by the CCD camera 536 onto the loaded memory card 13.

The memory card 13 is a Memory Stick (trademark), for example. The Memory Stick is a kind of flash memory card developed by Sony Corporation, the applicant hereof. The memory card 13 incorporates a flash memory element, one kind of EEPROM (Electrically Erasable and Programmable Read Only Memory), housed in a plastic case having dimensions of 21.5 mm×50 mm×2.8 mm. The memory card 13 allows writing and reading of various data such as images, voices, and music via a 10-pin terminal.

The Memory Stick uses a proprietary serial protocol which guarantees compatibility with the devices in which it is used even if the specifications of the incorporated flash memory have been changed due to the increase in its capacity for example, realizes the high-speed performance of maximum write rate of 1.5 MB/S and maximum read rate of 2.45 MB/S, and ensures high reliability by the provision of an error deletion preventing switch.

Consequently, the camera-mounted digital mobile telephone 16, configured to detachably load the memory card 13, can share data with other electronic devices via the memory card 13.

Figure 34:
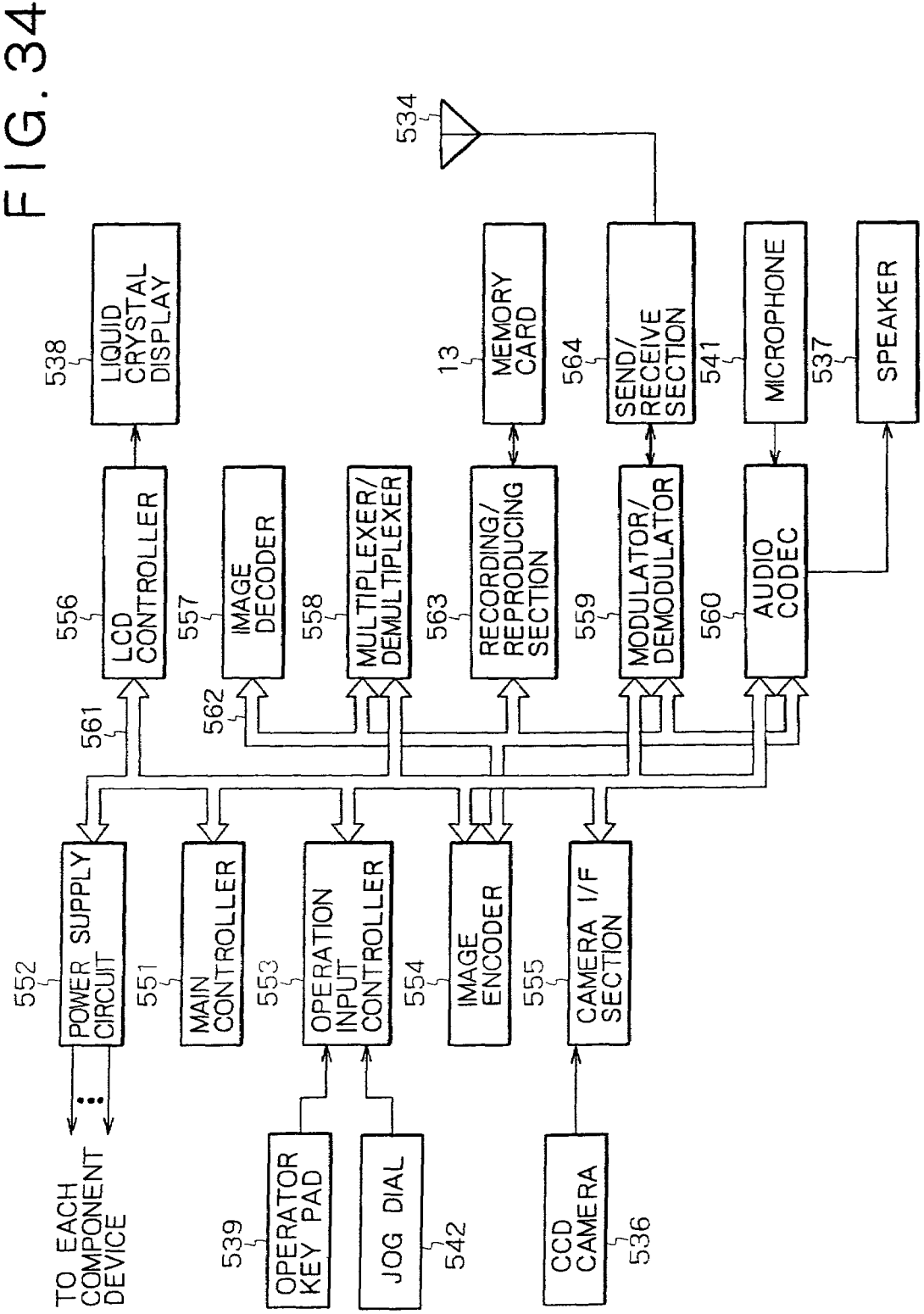
FIG. 34 is a block diagram illustrating an exemplary configuration of the camera-mounted digital mobile telephone.

As shown in FIG. 34, the camera-mounted digital mobile telephone 16 is configured so that a main controller 551 for centrally controlling each portion of the display section 531 and the main body 532 is connected to a power supply circuit 552, an operation input controller 553, an image encoder 554, a camera interface section 555, an LCD (Liquid Crystal Display) controller 556, an image decoder 557, a multiplexer/demultiplexer 558, a recording/reproducing section 563, a modulator/demodulator 559, and an audio codec 560 via a main bus 561. The image encoder 557, the image decoder 557, the multiplexer/demultiplexer 558, and the audio codec 560 are interconnected by a synchronous bus 562.

The power supply circuit 552, when the clear/power key is turned on by the user, supplies power from the battery pack to each component circuit, thereby making the camera-mounted digital mobile telephone 16 ready for operation.

Under the control of the main controller 551 composed of a CPU, a ROM, and a RAM for example, the camera-mounted digital mobile telephone 16 converts an audio signal picked up by the microphone 541 in the talk mode into digital audio data through the audio codec 560. The camera-mounted digital mobile telephone 16 performs spread spectrum on the digital audio data through a modulator/demodulator 559 and performs digital-to-analog conversion and then frequency conversion on the digital audio data through a send/receive circuit 564, sending the resultant digital audio data via the antenna 534.

The camera-mounted digital mobile telephone 16 amplifies a signal received at the antenna 534 in the talk mode, performs frequency conversion and analog-to-digital conversion on the amplified signal, performs spread spectrum on the converted signal through the modulator/demodulator 559, and converts the resultant signal into an analog audio signal through the audio codec 560. The camera-mounted digital mobile telephone 16 outputs a sound corresponding to this analog audio signal from the speaker 537.

Further, in the data communication mode, when sending content, the camera-mounted digital mobile telephone 16 sends the specified content input from the operator keys 539 and the jog dial 542 to the main controller 551.

The main controller 551 performs spread spectrum on the text data through the modulator/demodulator 559 and then digital-to-analog conversion and frequency conversion through the send/receive circuit 564, sending the resultant text data to the base station via the antenna 534.

In the data communication mode, when receiving content, the camera-mounted digital mobile telephone 16 performs reverse spread spectrum, through the modulator/demodulator 559, on the signal received from the base station via the antenna 534 to restore the original content and displays the original content on the liquid crystal display 538 through the LCD controller 556.

The LCD controller 556, like the locker server 11, is connected to the liquid crystal display 538 via a flexible printed circuit board having a panel ID setting section.

Then, the camera-mounted digital mobile telephone 16 can also record the content received in response to user operation onto the memory card 13 via the recording/reproducing section 563.

In the data communication mode, when sending image data, the camera-mounted digital mobile telephone 16 supplies the image data taken by the CCD camera 536 to the image encoder 554 via the camera interface section 555.

When not sending image data, the camera-mounted digital mobile telephone 16 can also display the image data taken by the CCD camera 536 on the liquid crystal display 538 via the camera interface section 555 and the LCD controller 556.

The image encoder 554 converts the image data supplied from the CCD camera 536 into coded image data by coding and compressing based on MPEG2 (Motion Picture Experts Group 2) or MPEG4, for example, and sends the coded image data to the multiplexer/demultiplexer 558.

At this moment, the camera-mounted digital mobile telephone 16 sends an audio signal picked up by the microphone 541 while taking the image by the CCD camera 536 to the multiplexer/demultiplexer 558 via the audio codec 560 as digital audio data.

The multiplexer/demultiplexer 558 multiplexes the coded image data supplied from the image encoder 554 with the audio data supplied from the audio codec 560 by a predetermined algorithm, performs spread spectrum on the resultant multiplexed data through the modulator/demodulator 559, and performs digital-to-analog conversion and frequency conversion through the send/receive circuit 564, outputting the resultant data via the antenna 534.

In the data communication mode, when receiving the data of a moving image file linked with a simplified home page, for example, the camera-mounted digital mobile telephone 16 performs reverse spread spectrum on the signal received from the base station via the antenna 534 through the modulator/demodulator 559 and sends the resultant multiplexed data to the multiplexer/demultiplexer 558.

The multiplexer/demultiplexer 558 divides the multiplexed data into coded image data and audio data, supplying the coded image data to the image decoder 557 and the audio data to the audio codec 560 via a synchronous bus 562.

The image decoder 557 generates reproduced moving image data by decoding the coded image data by the corresponding predetermined decoding algorithm such as MPEG2 or MPEG4, for example, and supplies the reproduced moving image data to the liquid crystal display 538 via the LCD controller 556. Consequently, the camera-mounted digital mobile telephone 16 displays the moving image data contained in a moving image file linked with a simplified home page, for example.

At the same time, the audio codec 560 converts the audio data into an analog audio signal and supplies it to the speaker 537. Consequently, the camera-mounted digital mobile telephone 16 reproduces the audio data contained in the moving image file linked with the simplified home page, for example.

It should be noted that, in the above-mentioned examples, the personal computer 1 or the camera-mounted digital mobile telephone 16 has been described to transmit the credit card number and the approval server 3, the ID management server 8, or the locker server 11 has been described to record the received credit card number; however, instead of the credit card number, the user's bank account number, Internet service provider registration number, or any other information which is available for fee-charging processing may be used.

The above-mentioned sequences of processes may be executed by hardware but they may also be executed by software. The execution by software is supported by a computer in which the programs constituting this software are stored in a dedicated hardware storage device or a general-purpose personal computer, for example, in which these programs are installed from a program storage medium.

The program storage medium storing the programs which are installed in a general-purpose personal computer, for example, to be made executable by the computer is a packaged medium constituted by the magnetic disk 91 or 131 (including floppy disk), the optical disk 92 or 132 (including CD-ROM (Compact Disk Read Only Memory) and DVD (Digital Versatile Disk)), the magneto-optical disk 93 or 133 (including MD (Mini Disk)), or the semiconductor memory 94 or 134, as shown in FIG. 3 or 4, or the program storage medium is constituted by the ROM 72 or 102, or the HDD 81 or 111, for example, which store the programs on a temporary or permanent basis. As required, the programs are stored in the program storage medium by use of a wired or wireless communications medium such as a local area network, the Internet, or digital satellite broadcasting via such interface as a router or modem.

The steps describing the programs provided by the above-mentioned program storage medium include not only processes which are executed in the described sequence in a time-dependent manner, but also processes which are executed in parallel or discretely.

It should be noted that term "system" herein denotes an entire apparatus constituted by a plurality of devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus, comprising:
a receiver operable to receive identification data and a credit card number from any computer within a defined group of plural computers;
means operable to generate a group key on the basis of a group identifier for identifying the defined group and a password, wherein one of the group identifier or the password is the credit card number, if a respective computer is a first computer within the defined group to supply the identification data to the receiver and operable to obtain the generated group key if the respective computer is not the first computer within the defined group to supply the identification data to the receiver, the group key being the same for all of the computers within the defined group and the group key being an encryption/decryption key usable to encrypt and/or decrypt data supplied between any two or more computers within the defined group, such that contents are shareable by the group key; and
a transmitter operable to transmit the group key to the respective computer which supplied the identification data,
said defined group of plural computers being associated with the same user.

2. The information processing apparatus according to claim 1, wherein said identification data includes data for identifying a content management program.

3. The information processing apparatus according to claim 1, wherein the transmitter transmits the group identifier to the respective computer, and wherein the group identifier is the same for each one of the plural computers within the defined group.

4. A method for processing information with the use of an information processing apparatus, said method comprising:
enabling identification data and a credit card number to be received from any computer within a defined group of plural computers;
generating a group key on the basis of a group identifier for identifying the defined group and a password, wherein one of the group identifier or the password is the credit card number, if a respective computer is a first computer within the defined group to supply the identification data and obtaining the generated group key if the respective computer is not the first computer within the defined group to supply the identification data, the group key being the same for all of the computers within the defined group and the group key being an encryption/decryption key usable to encrypt and/or decrypt data supplied between any two or more computers within the defined group of computers, such that contents are shareable by the group key; and
transmitting the group key to the respective computer which supplied the identification data,
said defined group of plural computers being associated with the same user.

5. The method according to claim 4, further comprising: transmitting the group identifier to the respective computer, and wherein the group identifier is the same for each one of the plural computers within the defined group.

6. A computer-readable medium having stored therein a computer program having instructions for carrying out a method of processing information in an information processing apparatus, said method comprising:
enabling identification data and a credit card number to be received from any computer within a defined group of plural computers;

generating a group key on the basis of a group identifier for identifying the defined group and a password, wherein one of the group identifier or the password is the credit card number, if a respective computer is a first computer within the defined group to supply the identification data and obtaining the generated group key if the respective computer is not the first computer within the defined group to supply the identification data, the group key being the same for all of the computers within the defined group and the group key being an encryption/decryption key usable to encrypt and/or decrypt data supplied between any two or more computers within the defined group, such that contents are shareable by the group key; and transmitting the group key to the respective computer which supplied the identification data, said defined group of plural computers being associated with the same user.

7. The computer-readable medium according to claim 6, wherein said method further comprises: transmitting the group identifier to the respective computer, and wherein the group identifiers is the same for each one of the plural computers within the defined group.

8. An information processing apparatus for authorizing or denying a request by any computer within a defined group of plural computers to copy information from any other computer within the defined group, said apparatus comprising:

a storage unit configured to store a first identifier which identifies the defined group;

a receiver unit configured to receive a second identifier from the respective computer requesting information;

a comparing unit configured to compare the first identifier and a credit card number with the second identifier and to produce a comparison result therefrom;

means operable to generate a group key on the basis of a group identifier for identifying the defined group and a password, wherein one of the group identifier or the password is the credit card number, and to supply the group key to the respective computer depending upon the comparison result, the group key being the same for all of the computers within the defined group and the group key being an encryption/decryption key usable to decrypt the information requested by the respective computer, such that contents are shareable by the group key, said defined group of plural computers being associated with the same user.

9. The information processing apparatus according to claim 8, wherein the second identifier is a password, and wherein said comparing unit is configured to compare said first identifier with said password.

10. A method for authorizing or denying a request by any computer within a defined group of plural computers to copy information from any other computer within the defined group, said method comprising:

storing a first identifier which identifies the defined group;

receiving a second identifier and a credit card number from the respective computer requesting information;

comparing the first identifier with the second identifier and producing a comparison result therefrom;

generating a group key on the basis of a group identifier for identifying the defined group and a password, wherein one of the group identifier or the password is the credit card number, and supplying the group key to the respective computer depending upon the comparison result, the group key being the same for all of the computers within the defined group and the group key being an encryption/decryption key usable to decrypt the information requested by the respective computer, such that contents are shareable by the group key, said defined group of plural computers being associated with the same user.

11. A computer-readable medium having stored therein computer program having instructions for carrying out a method of authorizing or denying a request by any computer within a defined group of plural computers to copy information from any other computer within the defined group, method comprising:

storing a first identifier which identifies the defined group;

receiving a second identifier and a credit card number from the respective computer requesting information;

comparing the first identifier with the second identifier and producing a comparison result therefrom;

generating a group key on the basis of a group identifier for identifying the defined group and a password, wherein one of the group identifier or the password is the credit card number, and supplying the group key to the respective computer depending upon the comparison result, the group key being the same for all of the computers within the defined group and the group key being an encryption/decryption key usable to decrypt the information requested by the respective computer, such that contents are shareable by the group key, said defined group of plural computers being associated with the same user.

12. A computer apparatus connectable to a plurality of other computer apparatus such that the computer apparatus and the plurality of other computer apparatus form a defined group, said computer apparatus comprising:

a transmitter operable to transmit identification data and a credit card number to an information processing apparatus;

a receiver operable to receive a group key from the information processing apparatus, the group key being generated on the basis of a group identifier for identifying the defined group and a password, wherein one of the group identifier or the password is the credit card number, and being shared for the computer apparatus within the defined group, in which contents transmitted between the computer apparatus are shared by the group key and the group key being the same for all of the computer apparatus within the defined group and the group key being an encryption/decryption key usable to encrypt and/or decrypt data supplied between any two or more computer apparatus within the defined group;

a storage unit operable to store the received group key; and an encryption unit operable to encrypt a content key by use of the group key, the content key being usable to encrypt content data, the information processing apparatus being located remote from the computer apparatus, the computer apparatus and the plurality of other computer apparatus which form the defined group are associated with the same user.

13. The computer apparatus according to claim 12, further comprising:

a decryption unit operable to decrypt said content key.

14. The computer apparatus according to claim 12, further comprising:

an acquisition unit operable to acquire the group identifier for identifying the defined group and the password;

a second transmitter operable to transmit said group identifier and said password acquired by said acquisition unit to a second information processing apparatus;

a second receiver operable to receive data for approving a copy operation from said second information processing apparatus; and a copy controller operable to control said copy operation based on said data received by said second receiver.

15. The information processing apparatus according to claim 12, wherein said identification data includes data for identifying a content management program.

16. A method for processing information with the use of a computer apparatus connectable to a plurality of other computer apparatus such that the computer apparatus and the plurality of other computer apparatus form a defined group, said method comprising:

transmitting identification data and a credit card number to an information processing apparatus;

receiving a group key from the information processing apparatus, the group key being generated on the basis of a group identifier for identifying the defined group and a password, wherein one of the group identifier or the password is the credit card number, and being shared for the computer apparatus within the defined group, in which contents transmitted between the computer apparatus are shared by the group key and the group key being the same for all of the computer apparatus within the defined group and the group key being an encryption/decryption key usable to encrypt and/or decrypt data supplied between any two or more computer apparatus within the defined group;

storing the received group key; and encrypting a content key by use of the group key, the content key being usable to encrypt content data, the information processing apparatus being located remote from the computer apparatus, the computer apparatus and the plurality of other computer apparatus which form the defined group are associated with the same user.

17. A computer-readable medium having stored therein a computer program having instructions for carrying out a method of processing information with the use of a computer apparatus connectable to a plurality of other computer apparatus such that the computer apparatus and the plurality of other computer apparatus form a defined group, said method comprising:

transmitting identification data and a credit card number to an information processing apparatus;

receiving a group key from the information processing apparatus, the group key being generated on the basis of a group identifier for identifying the defined group and a password, wherein one of the group identifier or the password is the credit card number, and being shared for the computer apparatus within the defined group, in which contents transmitted between the computer apparatus are shared by the group key and the group key being the same for all of the computer apparatus within the defined group and the group key being an encryption/decryption key usable to encrypt and/or decrypt data supplied between any two or more computer apparatus within the defined group;

storing the received group key; and encrypting a content key by use of the group key, the content key being usable to encrypt content data, the information processing apparatus being located remote from the computer apparatus, the computer apparatus and the plurality of other computer apparatus which form the defined group are associated with the same user.

18. An information processing apparatus, comprising:

a receiver operable to receive identification data and a credit card number from a computer;

a generator operable to generate an associated group key for each group comprising a plurality of computers in which contents are shared using the group key, the group key being generated on the basis of a group identifier for identifying the defined group and a password, wherein one of the group identifier or the password is the credit card number, and being an encryption/decryption key usable to encrypt and/or decrypt data supplied between any two or more computers within that group;

a register operable to register more than one identification of the computers belonging to a given group in relation to the group key of that group;

a judgment device operable to judge whether the identification received by the receiver is first in the given group or other than first in the given group;

a transmitter operable to transmit the group key generated for the given group to the computer; and a controller operable to control the generator to generate the group key for the given group and the register to register the group key and the identification of the computer if the judgement device judges the identification is received first, and the controller being operable to control the register of the identification of the computer in association with the group key if the judgement device judges that the identification is received other than first, said plurality of computers in the given group being associated with the same user.

19. The information processing apparatus according to claim 18, wherein the group key is used to encrypt content key corresponding to the content shared in the given group when the content is transferred between the computers in the given group.

20. The information processing apparatus according to claim 18, wherein the identification is identifying a content management program installed into the computer.

21. A method for processing information, said method comprising:

receiving an identification and a credit card number from a computer:

generating an associated group key for each group comprising a plurality of computers in which contents are shared using the group key, the group key being generated on the basis of a group identifier for identifying the defined group and a password, wherein one of the group identifier or the password is the credit card number, and being an encryption/decryption key usable to encrypt and/or decrypt data supplied between any two or more computers within that group;

registering more than one identification of the computers belonging to a given group in relation to the group key of that group;

judging whether the received identification is first in the given group or other than first in the given group;

transmitting the group key generated for the given group to the computer; and controlling the generating of the group key for the given group and the registering of the group key and the identification of the computer if the judging step judges the identification is received first, and controlling the registering of the identification of the computer in association with the group key if the judging step judges that the identification is received other than first, said plurality of computers in the given group being associated with the same user.

22. A computer-readable medium having stored therein a computer program having instructions for carrying out a method of processing information, said method comprising:
receiving an identification and a credit card number from a computer;
generating an associated group key for each group comprising a plurality of computers in which contents are shared using the group key, the group key being generated on the basis of a group identifier for identifying the defined group and a password, wherein one of the group identifier or the password is the credit card number, and being an encryption/decryption key usable to encrypt and/or decrypt data supplied between any two or more computers within that group;
registering more than one identification of the computers belonging to a given group in relation to the group key of that group;
judging whether the received identification is first in the given group or other than first in the given group;
transmitting the group key generated for the given group to the computer; and
controlling the generating of the group key for the given group and the registering of the group key and the identification of the computer if the judging step judges the identification is received first, and
controlling the registering of the identification of the computer in association with the group key if the judging step judges that the identification is received other than first,
said plurality of computers in the given group being associated with the same user.

* * * * *

UNITED STATES PATENT AND TRADEMARK OFFICE
CERTIFICATE OF CORRECTION

PATENT NO. : 7,526,657 B2 Page 1 of 1
APPLICATION NO. : 09/999225
DATED : April 28, 2009
INVENTOR(S) : Takanori Saneto et al.

It is certified that error appears in the above-identified patent and that said Letters Patent is hereby corrected as shown below:

On the Title page of the patent in Item (54), "INFORMATION PROCESSING APPARATUS, INFORMATION PROCESSING METHOD, AND PROGRAM STORAGE MEDIUM", should read --METHOD AND APPARATUS FOR PROCESSING INFORMATION USABLE IN A DEFINED GROUP OF COMPUTERS, AND STORAGE MEDIUM CONTAINING A PROGRAM RELATING THERETO--.

Column 1, the title of the invention, "INFORMATION PROCESSING APPARATUS, INFORMATION PROCESSING METHOD, AND PROGRAM STORAGE MEDIUM", should read --METHOD AND APPARATUS FOR PROCESSING INFORMATION USABLE IN A DEFINED GROUP OF COMPUTERS, AND STORAGE MEDIUM CONTAINING A PROGRAM RELATING THERETO--.

Column 31, line 22, "identifiers" should read --identifier--.

Signed and Sealed this

Thirty-first Day of August, 2010

David J. Kappos
*Director of the United States Patent and Trademark Office*